US012708581B2

(12) United States Patent
Nissen et al.

(10) Patent No.: US 12,708,581 B2
(45) Date of Patent: Aug. 18, 2026

(54) INFLATABLE DEVICE

(71) Applicant: OPAD Airway Inc., Bethesa, MD (US)

(72) Inventors: Mark D. Nissen, Minneapolis, MN (US); James M. Gayes, Naples, FL (US); Daniel M. Broberg, Deephaven, MN (US); Stephen McKeown, Hugo, MN (US); Laurence M. Sandell, Bethesda, MD (US)

(73) Assignee: OPAD Airway, Inc., Bethesda, MD (US)

( * ) Notice: Subject to any disclaimer, the term of this patent is extended or adjusted under 35 U.S.C. 154(b) by 597 days.

(21) Appl. No.: 18/135,885

(22) Filed: Apr. 18, 2023

(65) Prior Publication Data

US 2023/0270611 A1 Aug. 31, 2023

Related U.S. Application Data

(63) Continuation-in-part of application No. 17/975,533, filed on Oct. 27, 2022.

(60) Provisional application No. 63/430,428, filed on Dec. 6, 2022, provisional application No. 63/272,655, filed on Oct. 27, 2021.

(51) Int. Cl.
*A61G 13/12* (2006.01)

(52) U.S. Cl.
CPC ..... *A61G 13/1265* (2013.01); *A61G 13/1215* (2013.01); *A61G 2205/20* (2013.01)

(58) Field of Classification Search
CPC ............ A61G 13/1215; A61G 13/1265; A61G 13/12; A61G 13/1225; A61G 13/121; A61G 2205/20; A61G 7/07; A61G 7/1021; A61G 7/05776; A61G 2203/34; A61G 13/1295
USPC .......................................................... 128/845
See application file for complete search history.

(56) References Cited

U.S. PATENT DOCUMENTS

| | | | | |
|---|---|---|---|---|
| 2,896,227 | A | 7/1959 | Reed | |
| 3,711,130 | A * | 1/1973 | Betzler | F16L 33/30 285/259 |
| 4,685,163 | A | 8/1987 | Quillen | |
| 4,829,614 | A | 5/1989 | Harper | |
| 5,068,933 | A | 12/1991 | Sexton | |
| 5,086,529 | A | 2/1992 | Degroot | |
| 5,184,365 | A | 2/1993 | Stafford | |

(Continued)

OTHER PUBLICATIONS

James M. Gayes, MD, An Inflatable, Multichambered Upper Body Support for the Placement of the Obese Patient in the Head-Elevated Laryngoscopy Position, Anesthesia & Analgesia: May 2007—vol. 104—Issue 5—p. 1305-1306.

(Continued)

*Primary Examiner* — Daniel A Miller
(74) *Attorney, Agent, or Firm* — Laurence M. Sandell

(57) ABSTRACT

An inflatable device for patient positioning is provided. The inflatable device may include a first inflation module and a second inflation module. The first inflation module may include a tail, a first inflation chamber, and a second inflation chamber. The second inflation module may include a third inflation chamber and a plurality of uninflatable portions. The first inflation module and the second inflation module may be welded together at an inflation module weld. The second inflation module may be welded into a loop. The first inflation chamber and the second inflation chamber may be disposed within the loop.

20 Claims, 13 Drawing Sheets

(56) References Cited

U.S. PATENT DOCUMENTS

| | | | | |
|---|---|---|---|---|
| 5,528,783 | A | 6/1996 | Kunz | |
| 5,745,937 | A | 5/1998 | Weismiller | |
| 5,809,597 | A | 9/1998 | Shaw | |
| 5,848,450 | A | 12/1998 | Oexman | |
| 5,966,762 | A | 10/1999 | Wu | |
| 6,327,724 | B1 | 12/2001 | Sharrock | |
| 6,715,171 | B2 | 4/2004 | Grabe | |
| 6,751,818 | B2 | 6/2004 | Troop | |
| 6,935,340 | B2 | 8/2005 | Saied | |
| 7,383,599 | B2 | 6/2008 | Gabbay | |
| 7,716,763 | B2 | 5/2010 | Nissen | |
| 8,001,636 | B2 | 8/2011 | Nissen | |
| 8,458,834 | B1 | 6/2013 | Brown | |
| 10,448,765 | B2 | 10/2019 | Zhang | |
| 11,406,552 | B2 | 8/2022 | Viljoen | |
| 2002/0040501 | A1* | 4/2002 | Sharrock | A61G 7/07 5/630 |
| 2003/0098026 | A1 | 5/2003 | Saied | |
| 2005/0081866 | A1 | 4/2005 | Saied | |
| 2007/0181122 | A1 | 8/2007 | Mulier | |
| 2007/0240723 | A1 | 10/2007 | Hong | |
| 2008/0189864 | A1* | 8/2008 | Marguet | A61G 13/12 5/644 |
| 2010/0218316 | A1* | 9/2010 | Nissen | A61G 13/12 5/632 |
| 2011/0056502 | A1 | 3/2011 | Davis | |
| 2014/0041125 | A1 | 2/2014 | Grealy | |
| 2018/0110667 | A1* | 4/2018 | Freeman | A61G 13/04 |
| 2019/0201261 | A1* | 7/2019 | Galer | A47C 27/003 |
| 2019/0380504 | A1 | 12/2019 | Therkildsen | |
| 2020/0187685 | A1 | 6/2020 | Jeong | |

OTHER PUBLICATIONS

Wang X, Tao Y, Tao X, Chen J, Jin Y, Shan Z, Tan J, Cao Q, Pan T. An original design of remote robot-assisted Intubation system. Sci Rep. Sep. 7, 2018;8(1):13403. doi: 10.1038/s41598-018-31607-y. PMID: 30194353; PMCID: PMC6128927.

U.S. Appl. No. 60/740,086, filed Nov. 28, 2005.

Hemmerling TM, Wehbe M, Zaouter C, Taddei R, Morse J. The Kepler intubation system. Anesth Analg. Mar. 2012;114(3):590-4. doi: 10.1213/ANE.0b013e3182410cbf. Epub Dec. 20, 2011. PMID: 22190550.

Walls, Ron M., and Michael Francis Murphy, eds. Manual of emergency airway management. Lippincott Williams & Wilkins, 2008 (available at https://doctorlib.info/medical/airway/6.html).

* cited by examiner

INFLATABLE DEVICE

This Application is a Continuation-in-Part of co-pending U.S. application Ser. No. 17/975,533, filed Oct. 27, 2022, which claims the benefit of U.S. Provisional Patent Application No. 63/272,655, filed Oct. 27, 2021, the disclosure of which is hereby incorporated by reference in its entirety. This Application also claims the benefit of U.S. Provisional Patent Application No. 63/430,428, filed Dec. 6, 2022, the disclosure of which is hereby incorporated by reference in its entirety.

TECHNICAL FIELD

This application relates to devices, systems, and methods that utilize inflatable chambers to position patients and other individuals for medical procedures, to improve ventilation and airway management, and/or to otherwise improve human (and, in alternative embodiments, non-human animal) health or comfort. More specifically, this application relates to apparatuses, systems, and methods that utilize inflatable chambers that facilitate or accomplish the safe, effective, and efficient placement of a human individual into the Head Elevated Laryngoscopy Position ("HELP position") position or an approximation thereof, maintenance of the HELP position, return to supine position from the HELP position, and/or return to the HELP position.

Furthermore, this application relates to apparatuses, systems, and methods that utilize inflatable chambers that facilitate or accomplish the safe, effective, and efficient placement of a human individual into positions other than the HELP position, such as flexion at the head and neck ("flexion-flexion" position), extension at the head and neck ("extension-extension" position), and other flexion and extension combinations of the head, neck and upper torso to provide optimized positioning for medical procedures, to improve ventilation and airway management, and/or to otherwise improve health or comfort.

BACKGROUND

U.S. Pat. Nos. 7,716,763 and 8,001,636 disclose and claim certain inventive aspects of an "Apparatus and Method to Position a Patient for Airway Management and Endotracheal Intubation." However, there is room for improvement in the apparatus components, in, for example, apparatus control and operation, in overall apparatus design, and methods of use thereof.

For example, it may be advantageous to enable partial and/or substantial automation of the inflation process to improve efficiency, which, in turn, may save medical professionals' time and time of use of an operating room ("OR") or other medical theatre. In another example, it may be advantageous to provide additional safeguards and techniques to reduce the likelihood and severity of injury, and/or device malfunction or user error that might cause it. In yet another example, it may be advantageous to provide a modular air pressure supply configuration to support apparatus use in various environments and thereby improve device and user flexibility.

For obstetric applications, it may be advantageous to enable additional patient-specific customization with respect to the positioning of a left uterine-tilt device along the length of patient.

For variable patient body sizes, it may be advantageous to enable customization with respect to the positioning of smaller stature, pediatric, or infant patients.

It would also be advantageous to adapt and utilize the previously disclosed and improved apparatus embodiments to position a patient for optimal respiration in other contexts, for example, to treat acid reflux, obstructive sleep apnea, snoring, other sleep-related issues, improve patient symptoms, and/or otherwise enhance the healing processes.

SUMMARY

The present disclosure provides a description of apparatuses, systems, structures, algorithmic methods, non-algorithmic methods, and software to address the perceived problems described above.

In some embodiments, at least one non-transitory computer readable storage medium storing a computer program is provided. When executed by a computer incorporated or associated with the controller described herein, for example, a server, smart phone, PC, or tablet, the computer program may perform the algorithm embodiments described herein, or a relevant portion thereof.

It is to be understood that the descriptions herein are exemplary and explanatory only and are not restrictive of the inventive concepts disclosed.

In one example, a method of positioning a patient utilizing an inflatable device is provided. The inflatable device may include at least three independently inflatable chambers. A plurality of patient metrics may be received. A first chamber pressure target value, a second chamber pressure target value, and a third chamber pressure target value may be determined based on the plurality of patient metrics. The device may be inflated. The step of inflating the device may include inflating a first, second, and third chambers of the at least three independently inflatable chambers to the first, second, and third chamber pressure target values, respectively.

After inflating the first, second, and third chambers to the first, second, and third chamber pressure target values, respectively, the method may include receiving a request to increase or decrease pressure in at least one of the chambers. At least one of the chambers may be inflated or deflated in response to the request.

After inflating the first, second, and third chambers to the first, second, and third chamber pressure target values, respectively, the method may include receiving a confirmation that the patient is in the desired position. The first, second, and third chamber pressure target values and/or the current first, second, and third chamber pressure values may be saved as first, second, and third confirmed chamber pressure values for the patient, respectively.

The step of inflating the inflatable device may further include ordering the inflation of the first, second, and third chambers to reduce a risk of acute hypertension of a neck of the patient. The step of inflating the first chamber to the first chamber pressure target value may include supporting a head and neck of the patient. The step of inflating the second chamber to the second chamber pressure target value may include supporting a back and shoulders of the patient. The step of inflating the third chamber to the third chamber pressure target value may include supporting a thorax of the patient. The step of ordering the inflation to reduce the risk of acute hypertension may include inflating the first inflation chamber to at least 55% of the first chamber pressure target value before the second inflation chamber is inflated to 30% of the second chamber pressure target value. The step of ordering the inflation to reduce the risk of acute hypertension may include inflating the first inflation chamber to at least 55% of the first chamber pressure target value before the third inflation chamber is inflated to 30% of the third chamber pressure target value.

The step of receiving a plurality of patient metrics may include receiving measures of the patient's body weight and the patient's height. The step of receiving a plurality of patient metrics may include receiving a measure of at least one of the patient's neck circumference, neck width, head circumference, and head width. The step of receiving a plurality of patient metrics may consists of receiving two, three, four, or five measures of the patient's body habitus.

The step of determining the first, second, and third chamber pressure target values based on the plurality of patient metrics further comprises may include entering the plurality of patient metrics into a look-up table. The method may further include receiving the first, second, and third chamber pressure target values from the look-up table.

The step of determining the first, second, and third chamber pressure target values based on the plurality of patient metrics may include mapping the plurality of patient metrics into at least one fitted data curve. The method may further include receiving the first, second, and third chamber pressure target values from the at least one fitted data curve.

The method may further include a step of providing a user interface, including a touchscreen interface, and a step of receiving confirmation that the patient is aligned with the inflatable device prior to the step of inflating the inflatable device. The step of receiving a plurality of patient metrics may include receiving user input through the touchscreen interface. The step of receiving confirmation that the patient is aligned with the inflatable device may include may include receiving user input from the touchscreen interface.

The method may further include a step of providing a user interface, including a push-button interface, and a step of receiving confirmation that the patient is aligned with the inflatable device prior to the step of inflating the inflatable device. The step of receiving a plurality of patient metrics may include receiving user input through the push-button interface. The step of receiving confirmation that the patient is aligned with the inflatable device may include receiving user input from the push-button interface.

The method may further include the step providing at least one patient alignment sensor. The step of receiving confirmation that the supine patient's orientation is aligned with the inflatable device may include receiving data from the at least one patient alignment sensor.

The method may further include a step of providing a controller. The controller may include first, second, and third pressure output ports; first, second, and third pressure sensors; and first, second, and third chamber switches. The first, second, and third chamber switches may be configured to permit air flow through the first, second, and third pressure output ports, respectively. The method may further include connecting the first, second, and third pressure output ports of the controller to the first chamber, second chamber, and third chamber, respectively. The method may further include receiving a first pressure signal from the first pressure sensor, receiving a second pressure signal from the second pressure sensor, and receiving a third pressure signal from the third pressure sensor. The first pressure signal may be indicative of pressure in the first chamber, the second pressure signal may be indicative of pressure in the second chamber, and the third pressure signal may be indicative of pressure in the third chamber.

The step of inflating the first chamber may include controlling the first chamber switch based on a difference between the first pressure signal and the first chamber pressure target value. The step of inflating the second chamber may include controlling the second chamber switch based on a difference between the second pressure signal and the second chamber pressure target value. The step of inflating the third chamber further may include controlling the third chamber switch based on a difference between the third pressure signal and the third chamber pressure target value.

In another aspect, a controller for positioning a supine patient utilizing an inflatable device comprising at least three independently inflatable chambers is provided. The controller may include an electronic user interface; first, second, and third pressure output ports; first, second, and third pressure sensors; and/or first, second, and third chamber switches. The first, second, and third chamber switches may be configured to permit air flow through the first, second, and third pressure output ports, respectively. The controller may be configured to receive a plurality of patient metrics through the electronic user interface. The controller may be configured to determine a first chamber pressure target value, a second chamber pressure target value, and a third chamber pressure target value based on the plurality of patient metrics. The controller may be configured to inflate the inflatable device by inflating a first chamber of the inflatable device to the first chamber pressure target value; inflating a second chamber of inflatable to the second chamber pressure target value; and inflating a second chamber of the inflatable device to the third chamber pressure target value.

The controller may be further configured to receive a request to increase or decrease pressure in at least one of the first chamber, the second chamber, and the third chamber through the electronic user interface. The controller may be configured to inflate or deflate the at least one of the first chamber, the second chamber, and the third chamber in response to the request.

The controller may further be configured to perform other steps of recited methods of positioning a supine patient.

In another example, an inflatable device for patient positioning is provided. The inflatable device may include a first inflation chamber subsystem, a second inflation chamber subsystem, and a third inflation chamber subsystem. The first inflation chamber subsystem may include a first inflation chamber, a first tubing connection structure, and first tubing. The second inflation chamber subsystem may include a second inflation chamber, a second tubing connection structure, and second tubing. The third inflation chamber subsystem may include a third inflation chamber, a third tubing connection structure, and third tubing. At least a portion of the first inflation chamber subsystem may be conspicuously marked with a first color. At least a portion of the second inflation chamber subsystem may be conspicuously marked with a second color. At least a portion of the third inflation chamber subsystem may conspicuously marked with a third color. The first, second, and third colors may be visually distinct.

The first inflation chamber may include at least one first inflatable cylindrical structure. The second inflation chamber may include a second plurality of inflatable cylindrical structures. The third inflation chamber may include a third plurality of inflatable cylindrical structures. The plurality of second inflatable cylindrical structures may be fluidly connected to each other. The plurality of third inflatable cylindrical structures may be fluidly connected to each other.

The first tubing connection structure may be sealed into an end of the at least one first inflatable cylindrical structure. The second tubing connection structure may be sealed into an end of at least one of the second plurality of inflatable cylindrical structures. The third tubing connection structure may be sealed into an end of at least one of the third plurality of inflatable cylindrical structures. The first, second, and third tubing connection structures may be barbed tubing connectors.

The first tubing connection structure may be marked with the first color. The second tubing connection structure may be marked with the second color. The third tubing connection structure may be marked with the third color.

The first tubing may be connected to the first tubing structure. The second tubing may be connected to the second tubing structure. The third tubing may be connected to the third tubing structure. The first tubing may be tinted with the first color and/or marked with the first color at an end opposite the first tubing structure. The second tubing may be tinted with the second color and/or marked with the second color at an end opposite the first tubing structure. The third tubing may be tinted with the third color and/or marked with the third color at an end opposite the first tubing structure.

The third plurality of inflatable cylindrical structures may comprise a polymer tinted with the third color.

An end of the first inflatable cylindrical structure may be marked with the first color. An end of at least one of the second plurality of inflatable cylindrical structures may be marked with the second color. An end of at least one of the third plurality of inflatable cylindrical structures may be marked with the third color. Marked ends of the cylindrical structures may be on the same side of the inflatable device.

The first color may be a shade of green. The first inflation chamber may be configured to position a patient's head and neck based on its inflation level. The second color may be yellow. The second inflation chamber may be configured to position a patient's back and shoulders based on its inflation level. The third color may be blue. The third inflation chamber may be configured to position a patient's thorax based on its inflation level.

The inflatable device may further include a tail and a fourth inflation chamber subsystem. The fourth inflation chamber subsystem may include a fourth inflation chamber, a fourth tubing connection structure, and fourth tubing. The fourth inflation chamber and the tail may be configured such that the fourth inflation chamber may be secured at multiple positions along a length of the tail. The fourth inflation chamber may be configured to enable control of uterine tilt on a pregnant patient based on its inflation level. At least a portion of the fourth inflation chamber subsystem may be conspicuously marked with a fourth color that is distinct from the first, second, and third colors. The fourth color may be pink.

In another example, a controller for positioning a supine patient utilizing an inflatable device is provided. The inflatable device may include at least three independently inflatable chambers. The controller may include first, second, and third pressure output ports; first, second, and third pressure sensors; a plurality of electro-mechanical switches; an electronic user interface; an computer; a pressurized air input port; and an atmospheric air port. The plurality of electro-mechanical switches may be configured to control air flow through the first, second, and third pressure output ports independently. The first, second, and third pressure sensors may be configured to measure pressure internal to the first, second, and third pressure output ports, respectively. The computer may be configured to receive first, second, and third pressure signals from each of the first, second, and third pressure sensors, respectively. The computer may be configured to control each of the plurality of electro-mechanical switches. The computer may be configured to receive user input from the electronic user interface and provide information to the user through the electronic user interface.

The plurality of electro-mechanical switches may include first, second, and third chamber switches. The first chamber switch may be configured to control air flow through the first pressure output port. The second chamber switch may be configured to control air flow through the second pressure output port. The third chamber switch may be configured to control air flow through the third pressure output port.

Each of the first, second, and third chamber switches may be independently configured to switch between at least a first position configured to connect to the atmospheric port, a second position configured to connect to the pressured air input port, and a third position that is closed.

The plurality of electro-mechanical switches may further include a pressurization switch. The pressurization switch may be configured to switch between at least a first position configured to connect to the atmospheric air port, a second position configured to connect to the pressured air input port, and/or a third position that is closed. Each of the first, second, and third chamber switches are independently configured to switch between at least a first position configured to connect to the pressurization switch and a second position that is closed.

The electronic user interface may include a visual display. The computer may be configured to cause the display to output text indicative of the first, second, and third pressure signals.

The electronic user interface may include first, second, third, fourth, fifth and sixth user input buttons. The computer may be configured to manipulate the plurality of electro-mechanical switches to cause an increase in pressure in the first pressure output port upon receiving a signal that the first user input button has been pressed. The computer may be configured to manipulate the plurality of electro-mechanical switches to cause a decrease in pressure in the first pressure output port upon receiving a signal that the second user input button has been pressed. The computer may be configured to manipulate the plurality of electro-mechanical switches to cause an increase in pressure in the second pressure output port upon receiving a signal that the third user input button has been pressed. The computer may be configured to manipulate the plurality of electro-mechanical switches to cause a decrease in pressure in the second pressure output port upon receiving a signal that the fourth user input button has been pressed. The computer may be configured to manipulate the plurality of electro-mechanical switches to cause an increase in pressure in the third pressure output port upon receiving a signal that fifth first user input button has been pressed. The computer may be configured to manipulate the plurality of electro-mechanical switches to cause a decrease in pressure in the third pressure output port upon receiving a signal that the sixth user input button has been pressed.

The electronic user interface may include a touch screen. The first, second, third, fourth, fifth and sixth user input buttons may be rendered on the touch screen.

The first pressure output port may include a first quick-connect fitting configured to receive first tubing. The second pressure output port may include a second quick-connect fitting configured to receive second tubing. The third pressure output port further may include a third quick-connect fitting configured to receive third tubing.

The computer may be further configured to store first, second, and third target chamber inflation pressure values. The electronic user interface may include a first user input button. The computer may be configured to manipulate the plurality of electro-mechanical switches to cause pressure in the first pressure output port to equal the first target chamber inflation pressure value upon receiving a signal that the first user input button has been pressed. The computer may be configured to manipulate the plurality of electro-mechanical switches to cause pressure in the second pressure output port to equal the second target chamber inflation pressure value upon receiving a signal that the first user input button has been pressed. The computer may be configured to manipulate the plurality of electro-mechanical switches to cause pressure in the third pressure output port to equal the third target chamber inflation pressure value upon receiving a signal that the first user input button has been pressed.

The computer may be configured to store first, second, and third target chamber inflation pressure values. The electronic user interface may include at least a first user input button. The computer may be configured to, upon receiving a signal that the first user input button has been pressed, store a measure of pressure from the first pressure sensor as the first target chamber inflation pressure value; store a measure of pressure from the second pressure sensor as the second target chamber inflation pressure value; and store a measure of pressure from the third pressure sensor as the third target chamber inflation pressure value. The computer may be further configured to manipulate the plurality of electro-mechanical switches to cause pressure in the first, second, and third pressure output ports to equal atmospheric pressure upon receiving a signal that the first user input button has been pressed.

The electronic user interface may include a second user input button. The computer may be configured to, upon receiving a signal that the second user input button has been pressed, manipulate the plurality of electro-mechanical switches to cause pressure in the first pressure output port to equal the first target chamber inflation pressure value, to cause pressure in the second pressure output port to equal the second target chamber inflation pressure value, and to cause pressure in the third pressure output port to equal the second target chamber inflation pressure value.

The controller may further include a fourth pressure output port and a fourth pressure sensor. The plurality of electro-mechanical switches may be configured to independently control air flow through the fourth pressure output port independently from the first, second, and third output ports. The fourth pressure sensor may be configured to measure pressure internal to the fourth output port. The computer may be configured to receive a fourth pressure signal from the fourth pressure sensor.

The plurality of electro-mechanical switches may include first, second, third, and fourth chamber switches. The first chamber switch may be configured to control air flow through the first pressure output port. The second chamber switch may be configured to control air flow through the second pressure output port. The third chamber switch may be configured to control air flow through the third pressure output port. The fourth chamber switch may be configured to control air flow through the fourth pressure output port.

The controller may further include a fourth pressure sensor configured to measure pressure internal to pressurized air input port. The computer may be configured to receive a fourth pressure signal from the fourth pressure sensor. The computer may be configured to provide an alert indication through the electronic user interface if the fourth pressure signal is indicative of inadequate pressure.

The computer may be configured to provide an alert indication through the electronic user interface if the computer has instructed plurality of electro-mechanical switches to connect the first pressure output port to the pressured air input and the first pressure signal is indicative of decreasing pressure. The computer may be configured to provide an alert indication through the electronic user interface if the computer has instructed plurality of electro-mechanical switches to close the first pressure output port and the first pressure signal is indicative of decreasing pressure.

The computer may be configured to provide an alert indication through the electronic user interface if the computer has instructed plurality of electro-mechanical switches to connect the first pressure output port to the atmospheric port and the first pressure signal is indicative of increasing pressure. The computer may be configured to provide an alert indication through the electronic user interface if the computer has instructed plurality of electro-mechanical switches to close the first pressure output port and the first pressure signal is indicative of increasing pressure.

The computer may be configured to manipulate the plurality of electro-mechanical switches to cause pressure in at least the second pressure output port to undulate on a periodic basis. The periodic basis may be 10 minutes or less.

In another example, an inflatable device for patient positioning is provided. The inflatable device may include a first inflation module and a second inflation module. The first inflation module may include a tail, a first inflation chamber, and a second inflation chamber. The second inflation module may include a third inflation chamber and a plurality of uninflatable portions. The first inflation module and the second inflation module may be welded together at an inflation module weld. The second inflation module may be welded into a loop. The first inflation chamber and the second inflation chamber are disposed within the loop.

The first inflation chamber may include a head-tilt cylinder structure. The second inflation chamber may include a first back cylinder and a second back cylinder structure. The third inflation chamber may include a pair of base cylinder structures and a pair of head rest cylinder structures.

The plurality of uninflatable portions may include a rearside uninflatable portion attached to the pair of base cylinder structures and the pair of head rest cylinder structures, an underside uninflatable portion attached to the pair of base cylinder structures, and a back support surface attached to the pair of head rest cylinder structures. The inflation module weld may connect the tail, the back support surface, and the underside uninflatable surface. The inflation module weld may further define an intersection of the first back cylinder structure and the tail.

A first tubing connection structure may be embedded in the first inflation chamber. A second tubing connection structure may be embedded in the second inflation chamber. A third tubing connection structure may be embedded in the third inflation chamber.

The first inflation module may include a first lengthwise interior weld. The second inflation module may include a second lengthwise interior weld. The first and second tubing connection structures may be sealed within the first lengthwise interior weld. The third tubing connection structure may be sealed within the second lengthwise interior weld.

The first, second, and third tubing connection structures may be barbed tubing connectors.

The first inflation module may include a first folded section comprising four stacked layers on a first side of the inflation device. The first inflation module may include a second folded section comprising four stacked layers on a second side opposite the first side. A width of the first folded section may equal to a width of the second folded section.

A width of the first folded section may be between 1.5 and 3 inches. A second of the first folded section may be between 1.5 and 3 inches.

The first inflation module may include a first lengthwise interior weld. The first lengthwise interior weld may define an inner boundary of the first folded section.

The second inflation module may include a third folded section comprising four stacked layers on the first side. The second inflation module may include a fourth folded section comprising four stacked layers on the second side.

The second inflation module may include a second lengthwise interior weld. The second lengthwise interior weld may define an inner boundary of the third folded section.

Methods of manufacturing an inflatable device described herein are also provided.

BRIEF DESCRIPTION OF THE DRAWINGS

The accompanying drawings, which are incorporated into and constitute a part of this specification, illustrate several embodiments and aspects of the devices, systems, and methods described herein and, together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention, but rather discloses certain exemplary and/or suggestive embodiments thereof.

Figure 3:
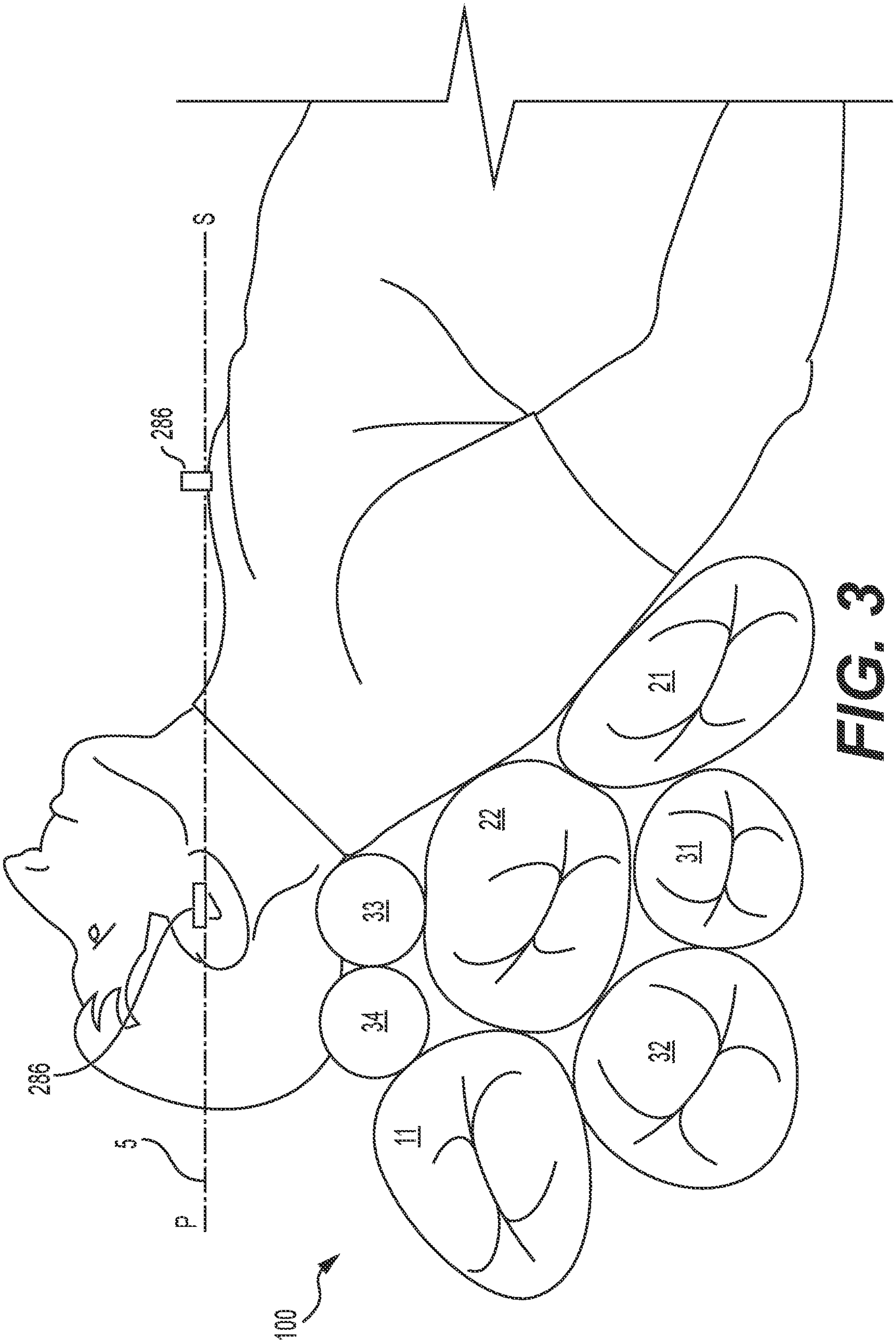
FIG. 3 is an illustration of a patient in the HELP position and supported by an embodiment of the inflatable device, in accordance with exemplary embodiments.

With reference to FIG. 3, a patient in the HELP (Head Elevated Laryngoscopy Position) Position is illustrated. The patient's upper body is supported by inflatable device 100 to obtain and maintain this position. The patient (herein patient is used in a broad sense and may be understood to include any human (or animal) that may be positioned by apparatuses, methods or systems disclosed herein) and inflatable device 100 may be understood to be on an operating room table, another substantially flat medical surface, a bed, a cot, and/or another substantially flat sleeping surface. As may be observed the pinna of the ear (ear lobe) and sternum (chest bone) are aligned, which may be depicted in a horizontal line, P-S line 5.

The HELP position aligns pharynx and larynx anatomically, which improves both spontaneous and controlled ventilation and laryngeal visualization during laryngoscopy. Additionally, because a patient's anatomical alignment corresponding to the HELP position improves airflow during natural breathing, it is believed that achievement and substantial maintenance of the HELP position or an approximation thereof during sleep, may be expected to relieve symptoms of and/or prevent Obstructive Sleep Apnea and/or snoring.

Figure 4B:
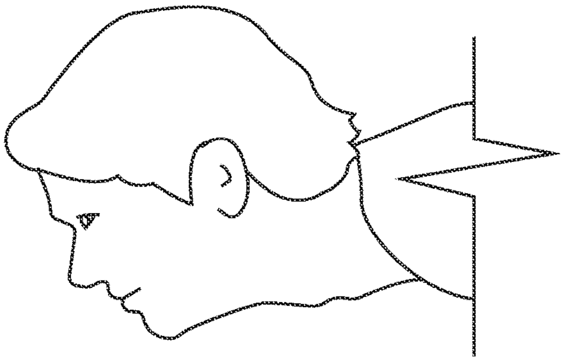
FIGS. 4A, 4B, and 4C are illustrations depicting the Flexion-Flexion position, the Extension-Extension position, and acute hyperextension of the neck, respectively.
Figure 4C:
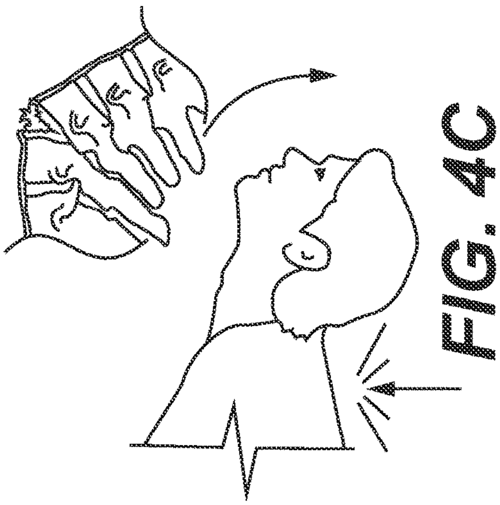
Figure 4A:
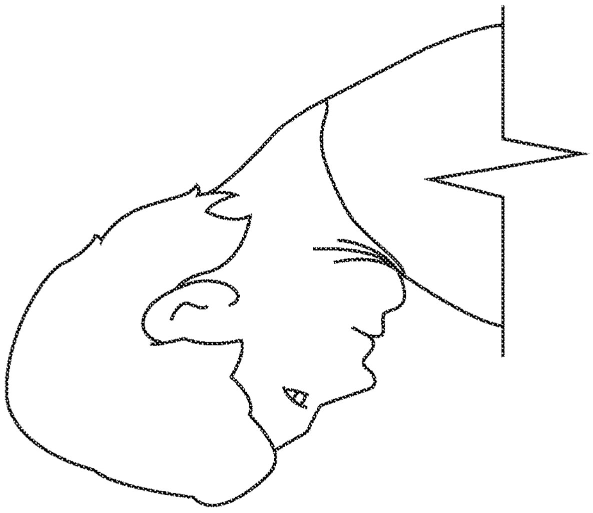

As depicted in FIG. 4A, the Flexion-Flexion position ("Flex-Flex") flexes the head and neck, which may provide an alternative alignment of the axes of the oropharynx and larynx to improve both spontaneous and controlled ventilation and laryngeal visualization during laryngoscopy. For example, it may be a more optimal or preferred position for patients with severe kyphosis or cervical spine injury/in a c-collar. Additionally, the Flex-Flex position is commonly utilized for surgical positioning during procedures on the occiput and posterior cervical spine, and tracheal resection surgery.

As depicted in FIG. 4B, the Extension-Extension position ("Extend-Extend") extends the head and neck, which may provide an alternative alignment of the axes of the oropharynx and larynx to improve both spontaneous and controlled ventilation and laryngeal visualization during laryngoscopy. For example, it may be a more optimal or preferred position for patients with limited cervical mobility due to cervical fusion. Additionally, the Extend-Extend position is commonly utilized for surgical positioning during procedures such as mediastinoscopy and thyroid surgery.

Other flexion and extension combinations of the head, neck and upper torso may provide alternative alignment of the axes of the oropharynx and larynx to improve both spontaneous and controlled ventilation and laryngeal visualization during laryngoscopy. Additionally, other flexion and extension combinations of the head, neck and upper torso may provide optimized surgical positioning for various procedures. For example, patients in lateral-decubitus positioning for lung resection surgery typically require flexion of the upper torso and the insertion of an axillary roll, and various head, neck and thoracic surgeries require lateral rotation of the head, neck and torso for surgical exposure and/or protection of the nerves and muscles. Another example is placing the patient in the supine position, in which the patient's head, neck and upper torso require support to reduce stress or injury of the spine and/or to optimize the surgical position. A further example is use in the intensive care unit or rehabilitation environment where positioning, alternating positioning and/or support may reduce pressure leading to skin and soft tissue injury.

Examples of other certain alternative patient positions for airway management that may be achieved and/or maintained through contemplated embodiments of inflatable device 100 are discussed and/or illustrated in the following: Walls, Ron M., and Michael Francis Murphy, eds. Manual of emergency airway management. Lippincott Williams & Wilkins, 2008 (available at https://doctorlib.info/medical/airway/6.html) (section titled "positioning the airway"), which is incorporated by reference herein.

Inflatable Device 100

Figure 1A:
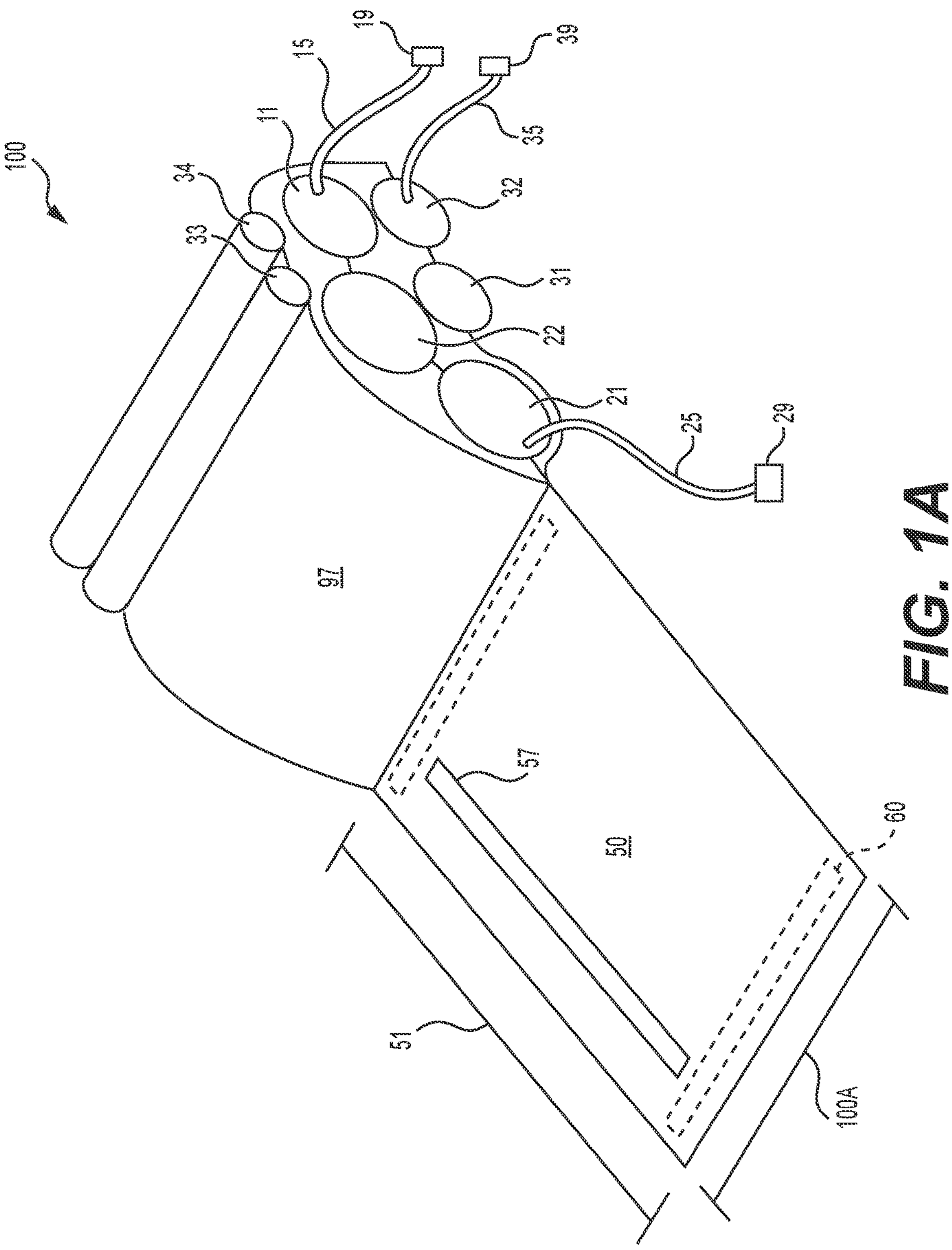
FIG. 1A is an illustration of an embodiment of an inflatable device of the disclosure, in accordance with exemplary embodiments.
Figure 1B:
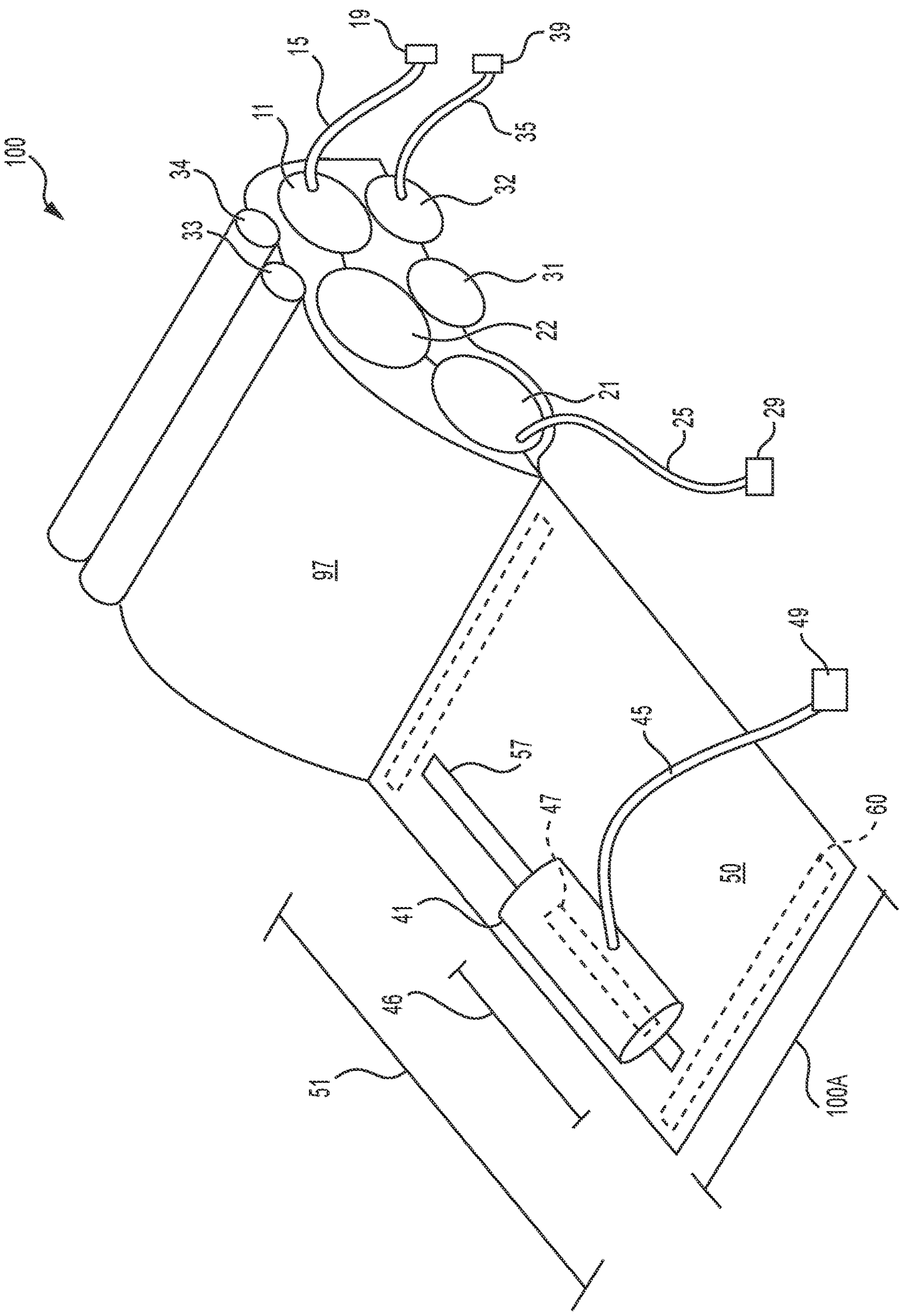
FIG. 1B is an illustration of the inflatable device embodiment of FIG. 1A, wherein a uterine tilt inflation chamber subsystem is mounted, in accordance with exemplary embodiments.
Figure 1C:
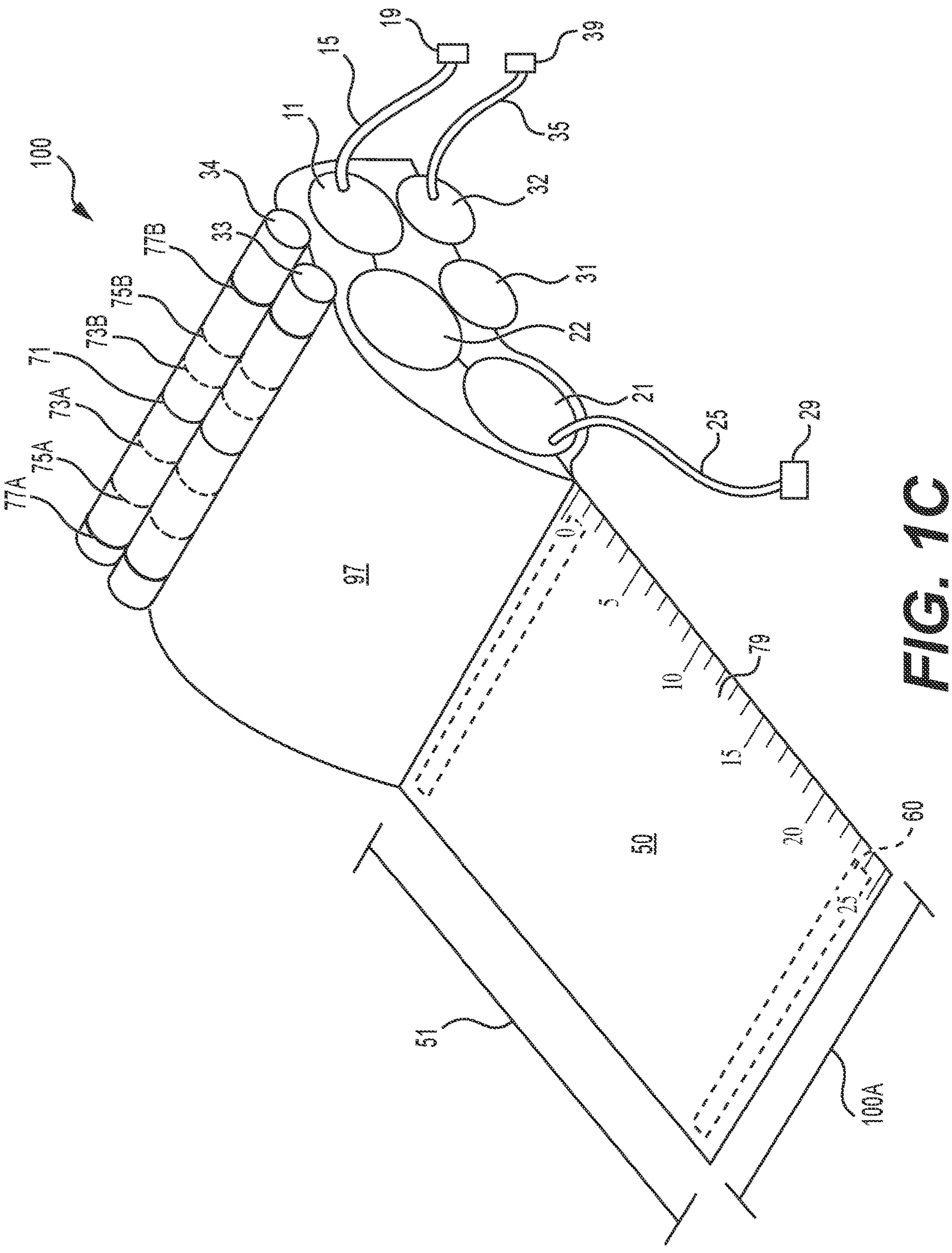
FIG. 1C is an illustration of the inflatable device embodiment of FIG. 1A, wherein centering lines and side measurement markings are also provided, in accordance with exemplary embodiments.

With reference to FIGS. 1A-1C, it may be observed that inflatable device 100 may comprise a head inflation chamber subsystem (see element numbers in the 10), a back inflation chamber subsystem (see element numbers in the 20*s*), and a thorax inflation chamber subsystem (see element numbers in the 30*s*). Inflatable device 100 may further comprise tail 50 to aid in securing inflatable device 100 to the flat surface upon which a patient rests.

Inflatable device 100 may preferably be substantially comprised of sheets or tubes of a suitable plastic or other polymer known in the art for flexibility, sufficient strength to withstand pressure, suitability for medical applications, durability, wettability, and/or to the extent possible, environmentally friendly disposal, such as recycling. It is contemplated that radio-frequency (RF) welding of polymer sheets may be utilized in certain embodiments and that the polymer may comprise polyurethane or another polymer suitable for RF welding. If heat sealed to form structures, polymer sheets may preferably be sealed together in a dot-dash-dot pattern rather than a dot-dot-dot pattern.

The head inflation chamber subsystem may be understood to substantially support the head and neck of the patient when appropriately inflated. Head inflation chamber subsystem may comprise head inflation chamber 10 (not labeled), tubing 15, and/or inp connector 19. Head inflation chamber 10 may comprise head-tilt cylinder 11. Tubing 15 may be utilized to inflate or deflate head tilt cylinder 11. Input connector 19 may be configured to securely connect with corresponding output port 219 of controller 200 so that the inflation level of head inflation chamber 10 may be controlled. Input connector 19 may be securely attached to tubing 15 opposite chamber 10. In some embodiments, input connector 19 may be omitted such that the end of tubing 15 opposite from head inflation chamber 10 may connect directly to output port 219.

The back inflation chamber subsystem may be understood to substantially support the back and shoulders of the patient when appropriately inflated. The back inflation subsystem may comprise back inflation chamber 20 (not labeled), tubing 25, and/or input connector 29. Back inflation chamber 20 may comprise first back cylinder 21 and second back cylinder 22. It is contemplated that, in preferred embodiments, first and second back cylinders 21, 22 be fluidly connected and substantially inflate and deflate concurrently. However, this disclosure is not so limited and contemplates that they may be separately inflated/deflated in alternative embodiments. Inflatable device 100 may also comprise back support surface 97 which may be adjacent to, abut, and/or fully or partially comprise the patient-facing surfaces of first and second back cylinders 21, 22. Tubing 25 may be utilized to inflate or deflate first and second back cylinders 21/22. Input connector 29 may be configured to securely connect with corresponding output port 229 of controller 200 so that the inflation level of back inflation chamber 20 may be controlled. Input connector 29 may be securely attached to tubing 25 opposite chamber 20. In some embodiments, input connector 29 may be omitted such that the end of tubing 25 opposite from back inflation chamber 20 may connect directly to output port 229.

A thorax inflation chamber subsystem may be understood to substantially support the head and thorax of the patient when appropriately inflated. The thorax inflation chamber subsystem may comprise thorax inflation chamber 30, tubing 35, and/or input connector 39. Thorax inflation chamber 30 (not labeled) may comprise first base cylinder 31, second base cylinder 32, first head rest cylinder 33, and second head rest cylinder 34. It is contemplated that, in preferred embodiments, first base cylinder 31, second base cylinder 32, first head rest cylinder 33, and second head rest cylinder 34 be fluidly connected and substantially inflate and deflate concurrently. However, this disclosure is not so limited and contemplates that they may be separately inflated/deflated in alternative embodiments. For example, in some embodiments thorax inflation chamber may be omitted and replaced with a head rest inflation chamber comprising first head rest cylinder 33 and second head rest cylinder 34, and a base inflation chamber comprising first base cylinder 31 and second base cylinder 32. Tubing 35 may be utilized to inflate or deflate first base cylinder 31, second base cylinder 32, first head rest cylinder 33, and second head rest cylinder 34. Input connector 39 may be configured to securely connect with corresponding output port 239 of controller 200 so that the inflation level of thorax inflation chamber 30 may be controlled. Input connector 39 may be securely attached to tubing 35 opposite chamber 30. In some embodiments, input connector 39 may be omitted such that the end of tubing 35 opposite from thorax inflation chamber 20 may connect directly to tubing connector 235.

It is contemplated that in certain embodiments, first and second base cylinders 31/32 may not be adjacent to first and second head rest cylinders 33/34. This may require the inclusion of additional structures to fluidly connect the cylinder pairs. In some such embodiments, for example as illustrated in FIGS. 8C and 8D, tubing 35 may be split, and thereby directly connect to each of the cylinder pairs.

With reference to FIG. 1B, it may be observed that, in some embodiments, inflatable device 100 may further comprise a uterine tilt inflation chamber subsystem. The uterine tilt inflation chamber subsystem may substantially tilt a pregnant patient's uterus to the left when appropriately inflated. Uterine tilt inflation chamber subsystem may comprise uterine tilt inflation chamber 40 (not labeled), tubing 45, and/or input connector 49. Uterine tilt inflation chamber 40 may comprise uterine tilt cylinder 41. Tubing 45 may be utilized to inflate or deflate uterine tilt cylinder 41. Input connector 49 may be configured to securely connect with corresponding output port 249 of controller 200 so that the inflation level of uterine tilt inflation chamber 40 may controlled. Input connector 49 may be securely attached to tubing 45 opposite chamber 40. In some embodiments, input connector 49 may be omitted such that the end of tubing 45 opposite from uterine tile inflation chamber 40 may connect directly to tubing connector 345.

With reference to U.S. Pat. Nos. 7,716,763 and 8,001,636, which are incorporated by reference herein in their entireties, uterine tilt inflation chamber 40 may be permanently affixed or integrally formed with the tail 50 or another portion of inflatable device 100. However, the inventors have observed that such a fixed position within inflatable device 100 may not be optimal. Uterine tilt may most effectively, efficiently, and/or conformably achieve by placing support under a pregnant woman's right side, from approximately her iliac crest to her lower ribcage. However, labor and delivery patients (like all patients) come in wide array of body types; accordingly, a fixed position for uterine tilt inflation chamber 40 with respect to other aspects of inflatable device 100 may not be ideal.

With reference to FIG. 1B, inflatable device 100 may support optimal, customizable placement of uterine tilt inflation chamber 40 by an anesthesiologist, OB/GYN, nurse, midwife, or other medical professional. Uterine tilt inflation chamber 40 may be securely mounted on tail 50 via placement mechanism 47. Additionally or alternatively, the top surface of tail 50 may be affixed with uterine tilt securing mechanism 57. In one embodiment, placement mechanism 47 and uterine tilt securing mechanism 57 may respectively comprise complementary Velcro strips. In another embodiment, placement mechanism 47 may comprise a strip of adhesive and perhaps, a protective, removeable strip for that adhesive (not shown).

Additionally or alternatively, uterine tilt securing mechanism 57 may comprise may comprise a strip (or multiple strips) of adhesive and, perhaps, one (or more than one) corresponding protective, removeable strip for that adhesive (not shown). For example, in some embodiments, a single strip of adhesive 57 may be covered by multiple, separately removable, protective strips, so that a medical professional may only remove the protective strips corresponding to the desired positioning of uterine tilt inflation chamber 40. However, because, in practice, it is contemplated that a sheet may be interposed between inflatable device 100 and the patient, it is unlikely that any otherwise exposed portions of uterine tilt securing mechanism 57 will irritate a patient's skin or otherwise cause problems.

It is contemplated that uterine tilt cylinder 41 may have a length 46 of 12-24 inches, more preferably between 15 and 21 inches, and most preferably between 17 and 19 inches (e.g., approximately 18 inches).

In certain embodiments, the ends of cylinders of inflatable device 100 (when inflated and without compression via a patient) may be substantially elliptical in shape—and thereby may be characterized by a long axis width and a short axis height. In other embodiments, the ends may be additionally or alternatively characterized as roughly circular—and thereby may be characterized by an approximate diameter. Accordingly, in various preferred embodiments, cylinders 11, 21, 22, 31, 32, 33, and 34 have following exemplary end dimensions when fully inflated (i.e., maximum inflation in structurally acceptable pressure ranges):

Head tilt cylinder 11:

a. elliptical end with horizontal axis of 3"-5" and vertical axis of 5"-7", more preferably, with horizontal axis of 3.5"-4.5" and vertical axis of 5.5"-6.5", more preferably, and most preferably with horizontal axis of approximately 4" vertical axis of approximately 6"
b. roughly circular end with a diameter of 4"-8", more preferable 5"-7, or most preferably approximately 6"

First back cylinder 21 and Second back cylinder 22:

a. elliptical end with horizontal axis of 3.25"-5.25" and vertical axis of 5"-7", more preferably, with horizontal axis of 3.75"-4.75" and vertical axis of 5.5"-6.5", more preferably, and most preferably with horizontal axis of approximately 4.25" vertical axis of approximately 6"
b. roughly circular end with a diameter of 4"-8", more preferable 5"-7, or most preferably approximately 6"

First base cylinder 31 and Second base cylinder 32:

a. elliptical end with horizontal axis of 3.25"-5.25" and vertical axis of 4"-6", more preferably, with horizontal axis of 3.75"-4.75" and vertical axis of 4.5"-5.5", more preferably, and most preferably with horizontal axis of approximately 4.25" vertical axis of approximately 5"
b. roughly circular end with a diameter of 3"-5", more preferable 3.5"-4.5", or most preferably approximately 4"

First head rest cylinder 33 and Second head rest cylinder 34:

a. elliptical end with horizontal axis of 2"-3" and vertical axis of 0.75"-2.75", more preferably, with horizontal axis of 2.5"-3.5" and vertical axis of 1.25"-2.25", more preferably, and most preferably with horizontal axis of approximately 3" vertical axis of approximately 1.75"
b. roughly circular end with a diameter of 1"-3", more preferable 1.5"-2.5", or most preferably approximately 2.25"

It is contemplated that in various alternative embodiments, one or more chambers and/or individual cylinders may be removable or omitted from inflatable device 100 to enable, for example, further customizable (e.g., non-HELP) optimal positioning, supine positioning, and/or surgical exposure.

It is contemplated that in various alternative embodiments, one or more chambers and/or individual cylinders may have an integrated mechanism for manual air removal, such as a plug or string that would open the particular chambers and/or individual cylinder to atmosphere enabling rapid deflations. This may be useful in an emergency or as a safeguard from device 100/200 malfunction when deflation through normal mechanisms fails.

It is contemplated that in various alternative embodiments, one or more chambers and/or individual cylinders may be nested internally within another chamber and/or individual cylinder. In various iterations, such structures may enable more customization for patient positioning, and/or serve a redundant safety function if a particular chamber and/or individual cylinder leaks or otherwise malfunctions.

With reference to FIG. 1C, inflatable device 100 may further comprise visible markings 70 (not labeled) that may facilitate proper centering of a patient upon inflatable device 100, proper positioning of uterine tilt inflation chamber 40 on inflatable device 100, and even determination of body metrics that may enable estimation of target inflation levels of chambers 10/20/30 (as further described below).

In one aspect, markings 70 may comprise centering line 71, narrow lines 73A/73B, intermediate lines 75A/75B, wider lines 77A/77B, and/or other pairs of lines disposed therebetween. In some embodiments, for example, as shown, these lines may be present upon present on first head rest cylinder 33 and/or second head rest cylinder 34. However, this disclosure is not so limited; the lines may extend through part or all of back support surface 97, cylinder 11, and/or other portions of inflatable device 100. The lines may facilitate centering a patient's head, neck, and/or thorax by a medical professional and/or maintaining such centering.

Additionally, the pairs of lines may be used to indicate a particular width of a patient's head, neck, torso, and/or the like. Such data may be useful in determining predicted optimal pressure levels of inflatable device 100 chambers, as discussed in more detail below. Accordingly, line pairs 73A/73B, 75A/75B, 77A/77B and or the like may indicate conventional measurements (e.g., number of inches or centimeters or from center line 71) or may indicate the start and end points of pre-designated body measurement ranges that may be useful in determining predicted optimal inflations levels. In some embodiments, the centering line and/or line pairs may comprise multiple colors. In alternative embodiments, the above described marking may not be lines, but rather may comprise colored or shaded blocks indicative of centering and/or body part width ranges.

In another aspect, markings 70 may comprise side measurement markings 79. As shown, side measurement markings 79 may be provided along one or more sides of tail 50, and may preferably start at the intersection of back support surface 97 and tail 50. Side measurement markings 79 may be used to measure a particular body metrics of the patient, such as, but not limited to, the distance to a patient's umbilicus (navel), Lumbar vertebra L4-5 and/or a line at the level of to the iliac crests when he or she is properly positioned on inflatable device 100. Such data may be useful in determining predicted target inflations levels of inflatable device 100 chambers, as discussed in more detail below. Side measurement markings 79 may indicate conventional measurements (e.g., number of inches or centimeters from back support surface 97) or may indicate the start and end points of pre-designated body metric ranges that may be useful in determining predicted target inflations levels. In alternative embodiments, the above-described side measurement markings 79 may not be lines, but rather may comprise colored or shaded blocks body part measurement ranges (e.g., the navel is in the red zone).

With reference to FIGS. 1A-1C, inflatable device 100 may have a width 100A and tail 50 may have a length 51. In preferred embodiments, especially in the clinical setting, length 51 may be approximately 24 inches. In various embodiments, length 51 may be between 18 and 30 inches, or more preferably between 20 and 28 inches. Such an extended tail 50 may improve its anchoring function because it may be expected that a patient's hips and/or buttock area would rest upon it (e.g., directly or through a sheet and/or clothing) and hold it in place against the flat surface. It is contemplated that alternative embodiments, tail 50 may be extended as far as the end of the OR table or other clinical surface.

Additionally or alternatively, with reference to FIGS. 1A and 1B, anchoring may be facilitated by the inclusion of one or more table securing mechanisms 60 on the underside surface of tail 50 and/or the inflatable portion of inflatable device 100 (not shown). In the depicted embodiment, table securing mechanisms 60 may comprise adhesive strips (e.g., with corresponding removable protective strips) that may temporarily affix inflatable device 100 to the top of an OR table or other appropriate surface. In another embodiment, an anti-skid emollient may be deposited on one or both sides of inflatable device 100 to prevent slippage between the underside of inflatable device 100 and the OR table or the like, and between the of top inflatable device 100 and a sheet below the patient. In yet another embodiment, inflatable device 100 may comprise one or more straps to secure it to the OR table or the like; such straps may extend from, for example, the bottom of tail 50, the sides of tail 50, the top of the inflatable portion, and/or the sides of the inflatable portion. In yet other embodiments, inflatable device 100 may comprise one or more Velcro and/or magnet mechanisms to secure it to the OR table—which may comprise or be affixed with a corresponding second Velcro or magnet mechanism secured to the OR table such that the inflatable device 100 is secured to the OR table.

In clinical use embodiments, width 100A may be approximately 20 inches or another similar width to comport with the size of an OR table and/or clinical surface. In various embodiments, width 1 may be 15-30 inches, more narrowly 18-25 inches, or even more narrowly, 19-22 inches. In other embodiments, for example, where inflatable device 100 is to be used to treat OSA or reduce its symptoms, a width between (and including) that of a standard size and that of a king size pillow may be desired, such as between approximately 26 and 36 inches. However, widths between 20 inches and 40 inches are contemplated. OSA patients (or other individuals seeking to improve breathing during sleep or rest) may view inflatable device 100 as a pillow replacement. Further, the extended width may help prevent the circumstance where an individual slides off or rolls off inflatable 100.

It is contemplated that, in certain preferred embodiments, all cylinders, with the exception of uterine tilt cylinder 41, may share the same width 100A. However, it is contemplated that in alternative embodiments, certain cylinders may not share width 100A.

Exemplary Inflatable Device 100 Assembly Embodiments

With reference to FIG. 5A-5D, certain embodiments of inflatable device 100 may substantially comprise first inflation module 1 and second inflation module 2. Each inflation module 1/2 may comprise a polymer tube welded in a manner to create the inflatable cylinders in the appropriate positions. Chambers 10/20/30 may be substantially from first and second inflation modules 1/2.

Figures 5A, 5B, 5C, 5D:
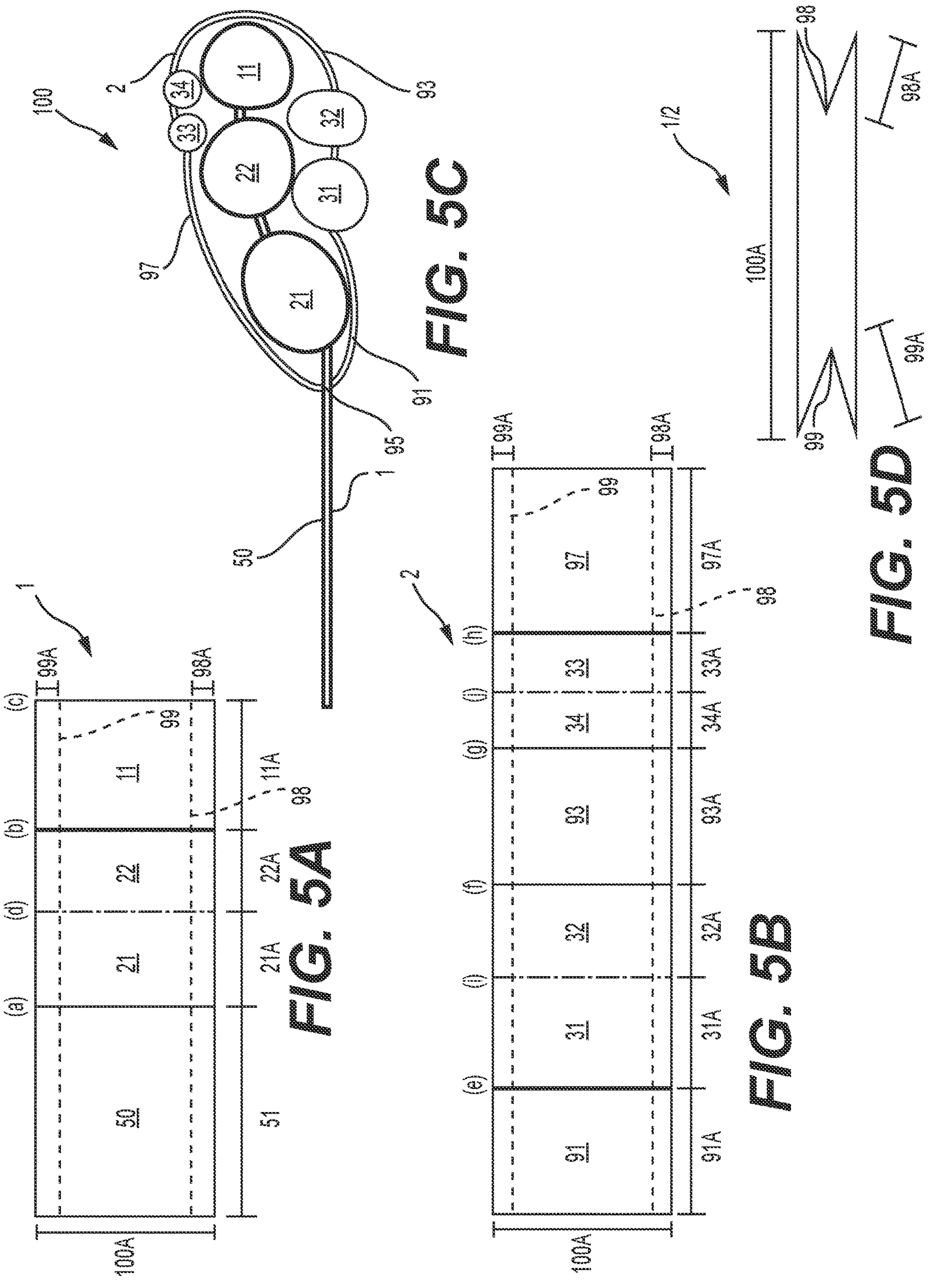
FIGS. 5A and 5B are schematic illustrations of a first inflation module and a second inflation module of an inflatable device, respectively, in accordance with exemplary embodiments.
FIG. 5C is a schematic illustration of an inflatable device embodiment comprising the first inflation module of FIG. 5A and the second inflation module of FIG. 5B, in accordance with exemplary embodiments.
FIG. 5D is a schematic cross-sectional illustration of an embodiment of an inflation module, in accordance with exemplary embodiments.

As best illustrated in FIG. 5D, a cross-section taken at a non-seamed portion of an inflation module 1/2 resembles a contiguous shape, with a generally flat top opposite a generally flat bottom—each with width 100A, and two folded in sides, each comprising four polymer layers. The innermost point of the first folded in side may, in certain preferred embodiments, comprise a weld converting a polymer sheet into a polymer tube. For example, in the embodiment of FIG. 5D, the innermost point of the first folded side is interior weld 98. In alternative embodiments, for example, where a seamless polymer tube is used as a starting materials, element 98 may be considered interior crease and not comprise a seam. The innermost point of the second folded in side may be designated as interior crease 99.

The first folded side may have a width of 98A and the second folded side may have a width of 99A. It may be preferred that widths 98A and 99A are substantially equal, but this disclosure is not so limited. In certain contemplated embodiments, lengths 98A and 99A may range from 1"-4", more preferably from 1.5"-3" and most preferably from 2"-2.5". As may be observed, lengths 98A and 99A may affect the size of the inflatable cylinders, particularly their vertical diameters.

Figure 6B:
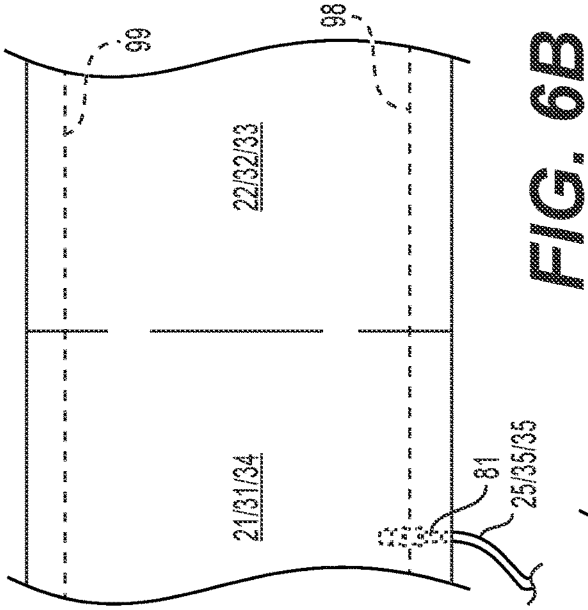
FIGS. 6A, 6B, 6C, 7A, 7B, 8A, 8B, 8C, and 8D are partial illustrations of inflation modules with tubing connection structures and tubing attached, in accordance with exemplary embodiments.

With reference to FIG. 5A, first inflation module 1 may form tail 50, first back cylinder 21, second back cylinder 22, and head tilt cylinder 11. Welds may be made to define the distinct components, and such welds may be made through both the first and second folded sides, including all four polymer layers. Welds made (a) between tail 50 and first back cylinder 21, (b) between second back cylinder 22 and head tilt cylinder 11, and (c) at the far end of head tilt cylinder 11 may be solid welds intended to prevent the passage of air therebetween. The weld (d) between first back cylinder 21 and second back cylinder 22 may comprise a partial weld, for example, with one or more gaps in the weld to permit the flow of air therethrough, for example as depicted in FIGS. 6A and 6B. In some embodiments, such gaps may be obtained by interposing one or more tubular structures into the weld. The end of tail 50 opposite from first back cylinder 21 may be fully or partially welded shut, or may remain open (e.g., resembling FIG. 5D).

First back cylinder 21 may have deflated length 21A, which may be about 9" in certain embodiments. Second back cylinder 22 may have deflated length 22A, which may be about 9" in certain embodiments. Head tilt cylinder 11 may have deflated length 11A, which may be about 9" in certain embodiments. Such embodiments contemplate length variances of 10%, up to 15%, and even up to 20%.

With reference to FIG. 5B, second inflation module 1 may form underside uninflatable portion 91, first base cylinder 31, second base cylinder 32, rearside uninflatable portion 93, second head rest cylinder 34, first head rest cylinder 33, and back support surface 97. Welds may be made to define the distinct components, and such welds may be made through the first and second folded sides. Welds made (e) between underside uninflatable portion 91 and first base cylinder 31, (f) between second base cylinder 32 and rearside uninflatable portion 93, (g) between rearside uninflatable portion 93 and first head rest cylinder 33, and (h) between first head rest cylinder 33 and back support surface 97 may be solid welds intended to prevent the passage of air therebetween. The welds (i) between second head rest cylinder 34 and first head rest cylinder 33 and (j) between second head rest cylinder 34 and first head rest cylinder 33 may be partial welds, for example as depicted in FIGS. 6A and 6B.

Figure 8B:
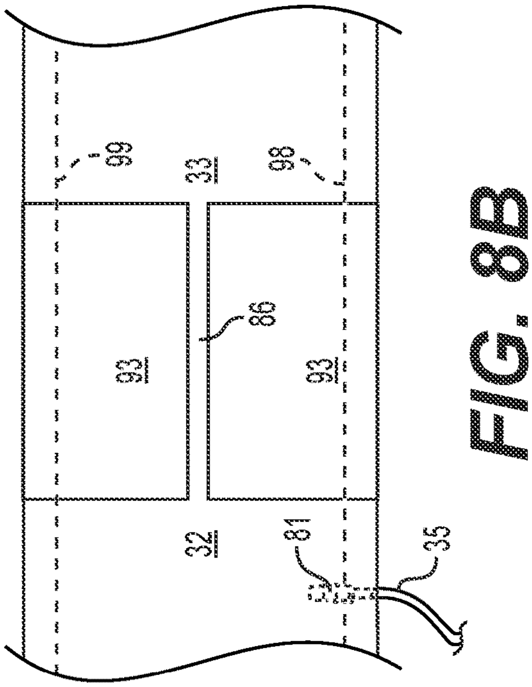
Figure 8D:
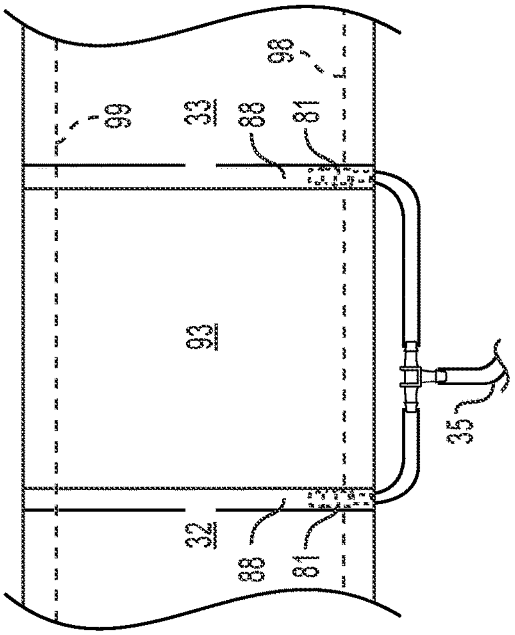
Figure 8A:
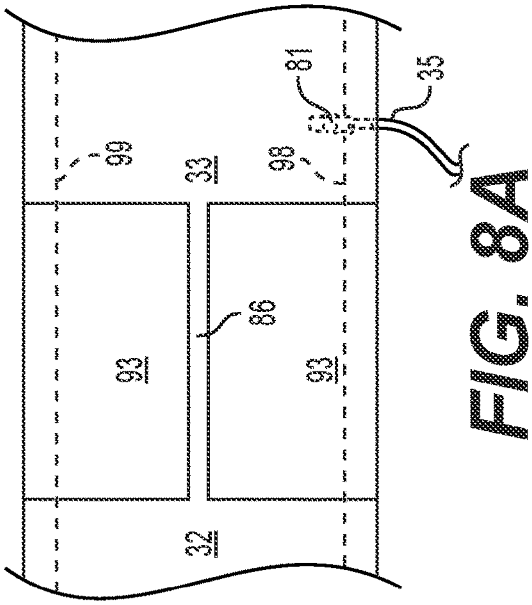
Figure 8C:
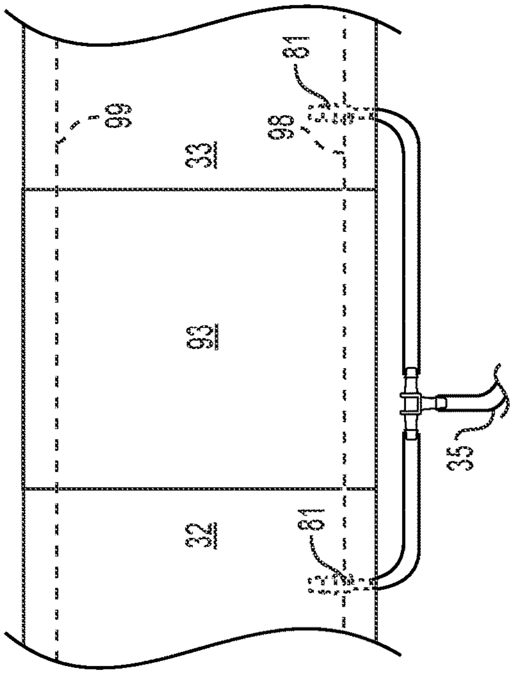

In some embodiments, for example as depicted in FIGS. 8A and 8B, weld (f) and (g) on opposing sides of rearside uninflatable portion 93 may not be solid straight line welds. While it is contemplated that such welds will ensure that no air passes from second base cylinder 32 into rearside uninflatable portion 93 or from first head rest cylinder 33 into rearside uninflatable portion 93, the welds of FIGS. 8A and 8B may define one or more internal passages 86 to permit the flow of air between second base cylinder 32 and second head rest cylinder 34.

Underside uninflatable portion 91 may have deflated length 91A, which may be about 7" in certain embodiments. First base cylinder 31 may have deflated length 31A, which may be about 7.5" in certain embodiments. Second base cylinder 32 may have deflated length 32A, which may be about 7.5" in certain embodiments. Rearside uninflatable portion 93 may have deflated length 93A, which may be about 10.5" in certain embodiments. Second head rest cylinder 34 may have deflated length 34A, which may be about 4" in certain embodiments. First head rest cylinder 33 may have deflated length 33A, which may be about 4" in certain embodiments. Back support surface 97 may have deflated length 97A, which may be about 16" in certain embodiments. Such embodiments contemplate length variances of 10%, up to 15%, and even up to 20%.

It is contemplated that, in some embodiments, additional welds (not shown) may be made within tail 50, underside uninflatable portion 91, rearside uninflatable portion 93, and/or back support surface 97, to improve structural integrity and minimize movement of such uninflatable portions and/or inflatable device 100 as a whole during use.

As best illustrated in FIG. 5C, inflation module weld 95 may connect first inflation module 1 and second inflation module 2 to substantially form inflatable device 100. Inflation module weld 95 may preferably seal together the ends of second inflation module 2 (e.g., at the far ends of underside uninflatable portion 91 and back support surface 97) and a portion of tail 50 be at a portion of tail 50 near first back cylinder 21. In alternative embodiments, inflation module weld 95 may be coextensive with weld (a) (or may be the same weld); in such embodiments inflation module weld 95 may define the boundary between tail 50 and first back cylinder 21.

Tubing 15/25/35/45 may be fluidly connected with corresponding chambers 10/20/30/40 via one or more tubing connection structures 81 to securely enable the flow of pressurized air with minimal leakage.

In certain embodiments, for example as depicted in FIGS. 6A, 6B, 7A, 8A, 8B, and 8C, tubing connection structure(s) 81 may be sealed into an inflation module 1/2 along interior weld 98, and accordingly into an appropriate chamber 11/21/22/31/32/33/34/41. In some embodiments, tubing connection structure(s) 81 may comprise barbed tubing connectors with at least one barb disposed external to the polymer tubes of an inflation module 1/2. In this manner, tubing 15/25/35/45 may be easily and securely attached to tubing connection structure(s) 81.

In other embodiments, tubing 15/25/35/45 may be inserted into or otherwise attached and fluidly connected to the interior of a cylinder utilizing different embodiments of tubing connection structure(s) 81. For example, tubing connection structure(s) 81 may comprise a rigid or semi-rigid metal or plastic ring; the ring may be surrounded by or otherwise provided with a cushioning component.

Tubing support structure 81 may prevent collapse or kinking of tubing that could undermine performance or operation of inflatable device 100. Preferably, tubing connection structure(s) 81 may be positioned on their respective chambers 10/20/30 in a manner that avoids contact with a patient and substantially reduces the risk of kinking or of tubing interfering with clinical tasks.

Additionally, it may be preferred that tubing connection structure(s) 81 are positioned in a manner that avoids stacking upon each other when inflatable device 100 is deflated—whether deployed under a patient or when folded in packaging. The stacking of two or more tubing connection structure(s) 81 may otherwise cause a pillar-type formation under a patient, which may, in turn, cause patient discomfort and/or increase the risk of pressure sores or scarring. For example, it is contemplated that tubing connection structure(s) 81 within inflatable device 100 that may otherwise have a risk of stacking (e.g. cylinders 34/11/32 and cylinders 33/22/22, respectively) may be positioned in a staggered pattern (e.g., with respect to a direction parallel to width 100A). Similarly, stacking may increase the footprint of a packaged inflatable device 100, potentially resulting in less efficient product distribution and/or less efficient use of scarce clinical storage space. A staggered pattern may similarly address this issue.

When inflatable device 100 is inflated in a clinical and/or sleep setting, it may be important to ensure that air is evenly distributed into each cylinder end to avoid tilting (e.g., left to right or vice versa) or pushing the patient in an undesirable manner—especially during cylinder inflation and deflation. (Herein, air is used broadly to refer to atmospheric/environmental air, medical air, CO2, and/or any gas suitable for safely inflating and deflating inflatable device 100.) To with, if a particular cylinder is inflated (or deflated) from one end, the typically centralized body weight of the patient may cause one end to inflate (or deflate) faster than the other.

Figure 6C:
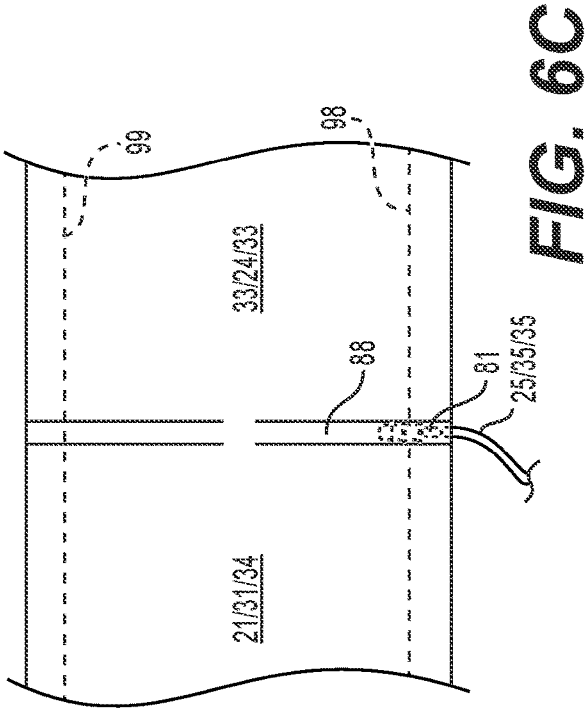
Figure 6A:
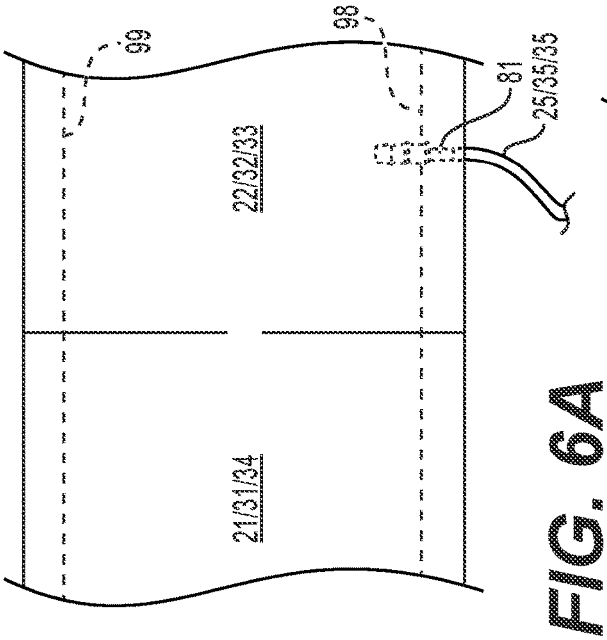
Figure 7B:
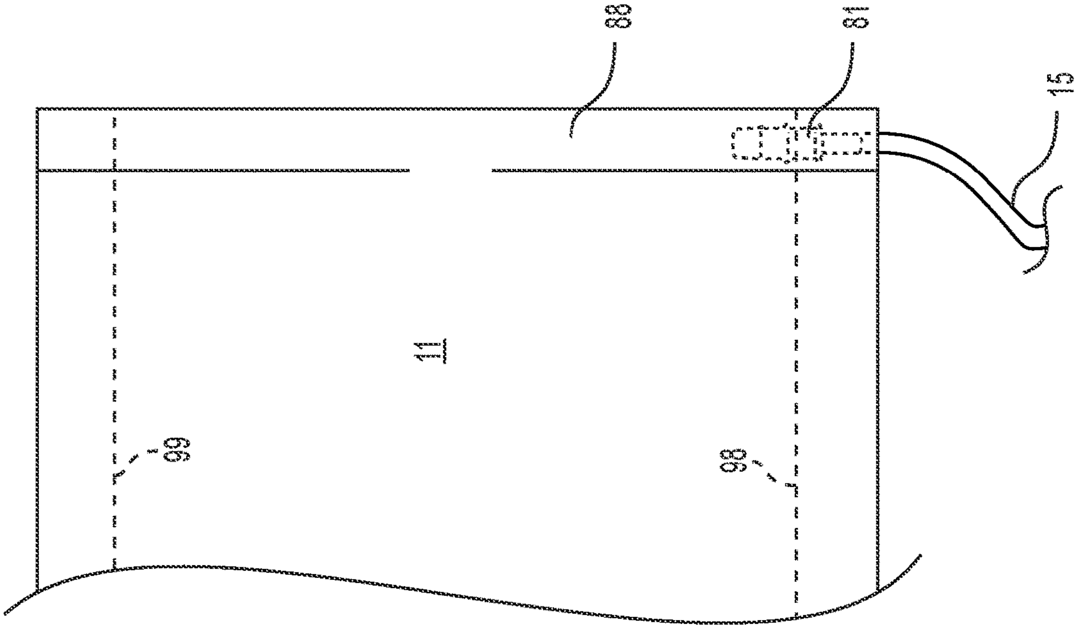
Figure 7A:
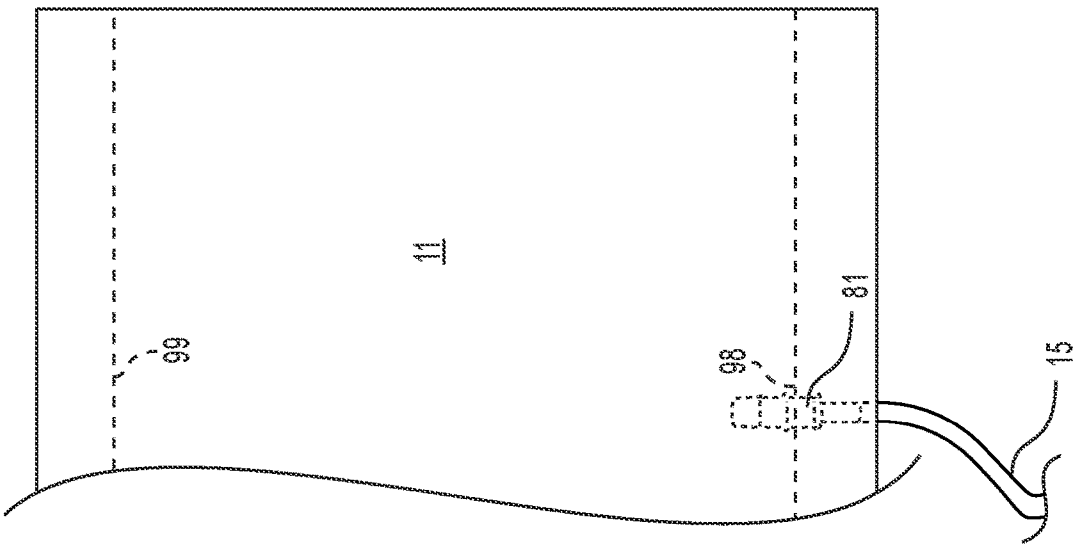

With reference to FIG. 6C, 7B, 8D, one or more pressure distribution mechanisms 88 may be formed via a partial weld and a solid weld (e.g., FIGS. 7B and 8D) or two partial welds (e.g., FIG. 6C). Such pressure distribution mechanism(s) 88 may serve to distribute air received through tubing connection structure(s) 81 to a more central part or multiple parts of a corresponding chamber (e.g., FIGS. 7B and 8D) or adjacent corresponding chambers (e.g., FIG. 6C). In this manner, pressure distribution mechanism (s) 88 may prevent or mitigate potentially problematic patient tilting.

With reference to FIGS. 9A-9D, alternative inflation cylinder configurations that may prevent or mitigate potentially problematic patient tilting are shown. As shown in FIG. 9A-9D, the tubing may be tubing 15/25/35/45, as discussed above, and may be configured to inflate or deflate a first cylinder of its respective inflation chamber 10/20/30/40. However, in preferred embodiments, inflation chambers 20 and 30 may comprise multiple cylinders. For such multi-cylinder chambers, internal tubing 85 may be utilized to fluidly connect multiple cylinders and facilitate concurrent inflation (or deflation). Additionally or alternatively, abutting cylinders belonging to the same chamber (e.g., cylinders 21/22, 31/32 and/or 33/34 in certain embodiments) may be fluidly connected without internal tubing 85, and instead may share one or more air channels directly on their respective surfaces. Such channels may, in some embodiments incorporate tubing connection structure(s) 81. When such channels are sealed into a weld, such weld may be considered gaps in the weld to permit the flow of air therethrough.

Figure 9A:
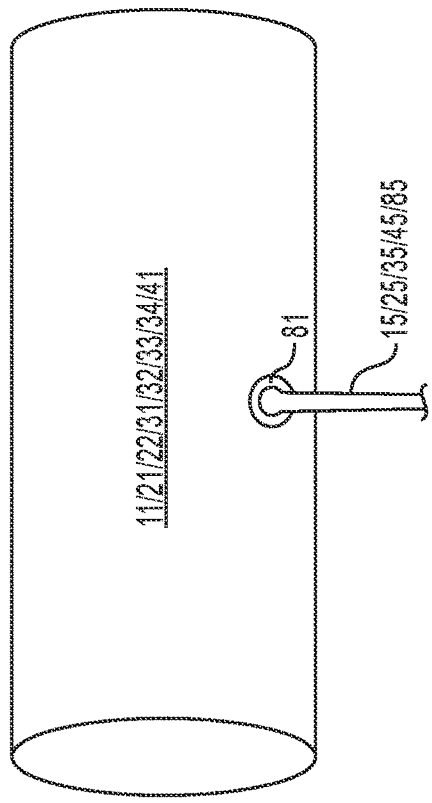
FIGS. 9A-9D are illustrations of structural aspects of alternative embodiments of an inflatable cylinder, in accordance with exemplary embodiments.

With reference to FIG. 9A, a cylinder may be inflated/deflated from a central location.

Figure 9B:
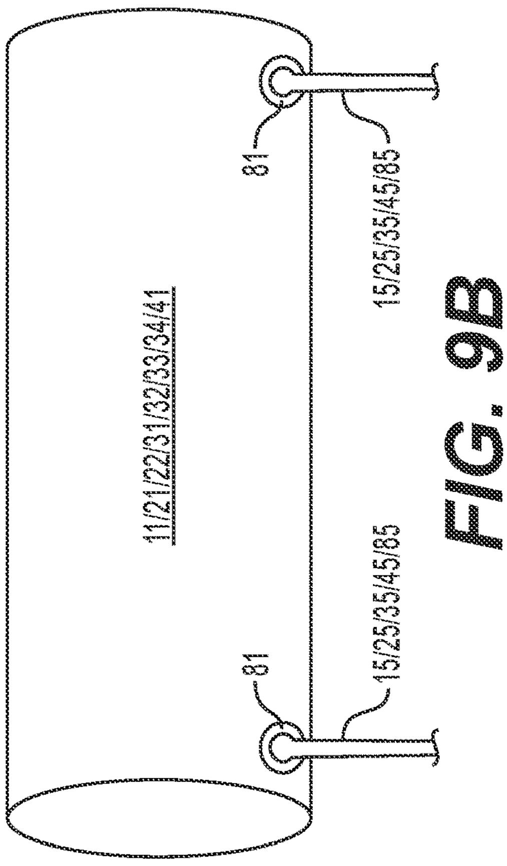

With reference to FIG. 9B, a cylinder may be inflated/deflated via receiving tubing on both ends. As depicted, the first and second tubing is received, respectively, by the curved cylindrical surface of the cylinder and toward its ends, but this disclosure is not so limited. In alternative embodiments, the tubing may be received on the opposite sides of the cylinder. It is contemplated that, in embodiments consistent with FIG. 4B, each air output from controller 200 may be split into first and second tubings for each chamber (or cylinder) configured for inflation in this manner.

Figure 9C:
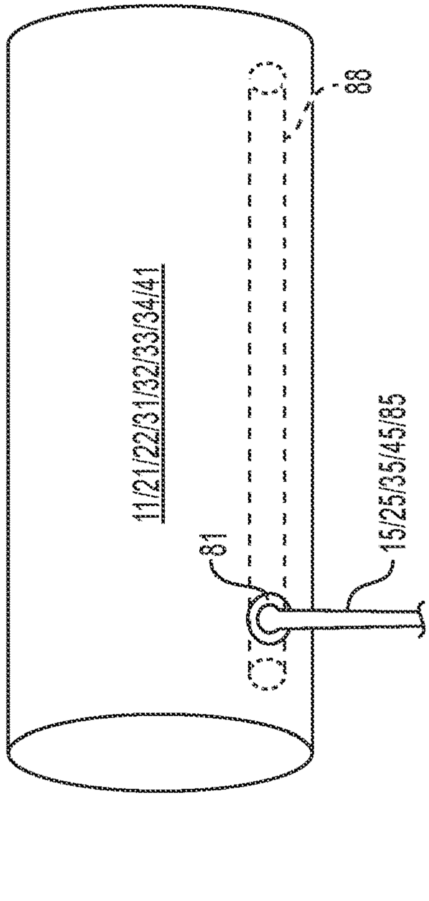

With reference to FIG. 9C, a cylinder may be inflated/deflated via receiving tubing on one end. As depicted, the tubing is positioned towards the ends of the curved cylindrical surface of the cylinder, but this disclosure is not so limited. In alternative embodiments, the tubing may be received on one of the opposite sides of the cylinder. In the embodiment of FIG. 4C, an air outlet/inlet may be provided near tubing support structure 81, but internal to the cylinder; additionally, tubing 15/25/35/45/85 may be fluidly connected to (or additionally comprise) pressure distribution mechanism 88. Intra-cylinder pressure distribution mechanism 88 may be tubing with an outlet/inlet within the cylinder at or near the end opposite from where tubing 15/25/35/45/85 attaches to or enters the cylinder. Intra-cylinder pressure distribution mechanism 88 may beneficially prevent or reduce the risk of uneven inflation/deflation while allowing for easier tubing management in the clinical or sleep setting.

Figure 9D:
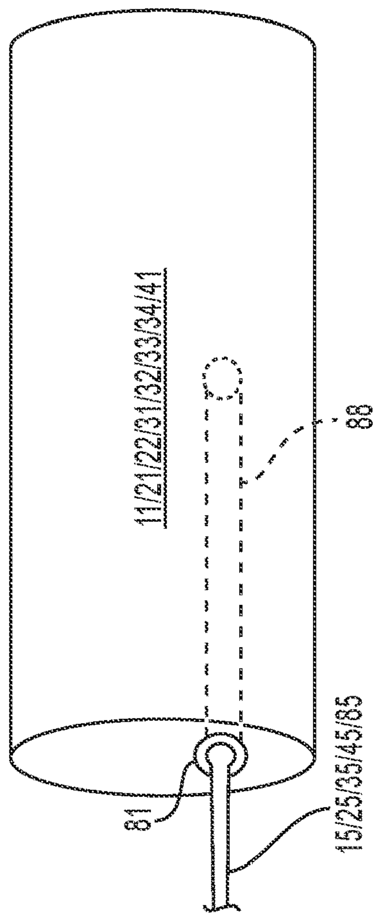

With reference to FIG. 9D, a cylinder may be inflated/deflated via receiving tubing on one end. As depicted, the tubing may be received on one of the opposite sides of the cylinder, but this disclosure is not so limited. In alternative embodiments, the tubing may be positioned towards one end of the curved cylindrical surface of the cylinder. In the embodiment of FIG. 4D, intra-cylinder pressure distribution mechanism 88 may allow inflation and deflation of a cylinder from its center. Intra-cylinder pressure distribution mechanism 88 may be considered part of tubing 15/25/35/45/85 in some embodiments.

Figure 11:
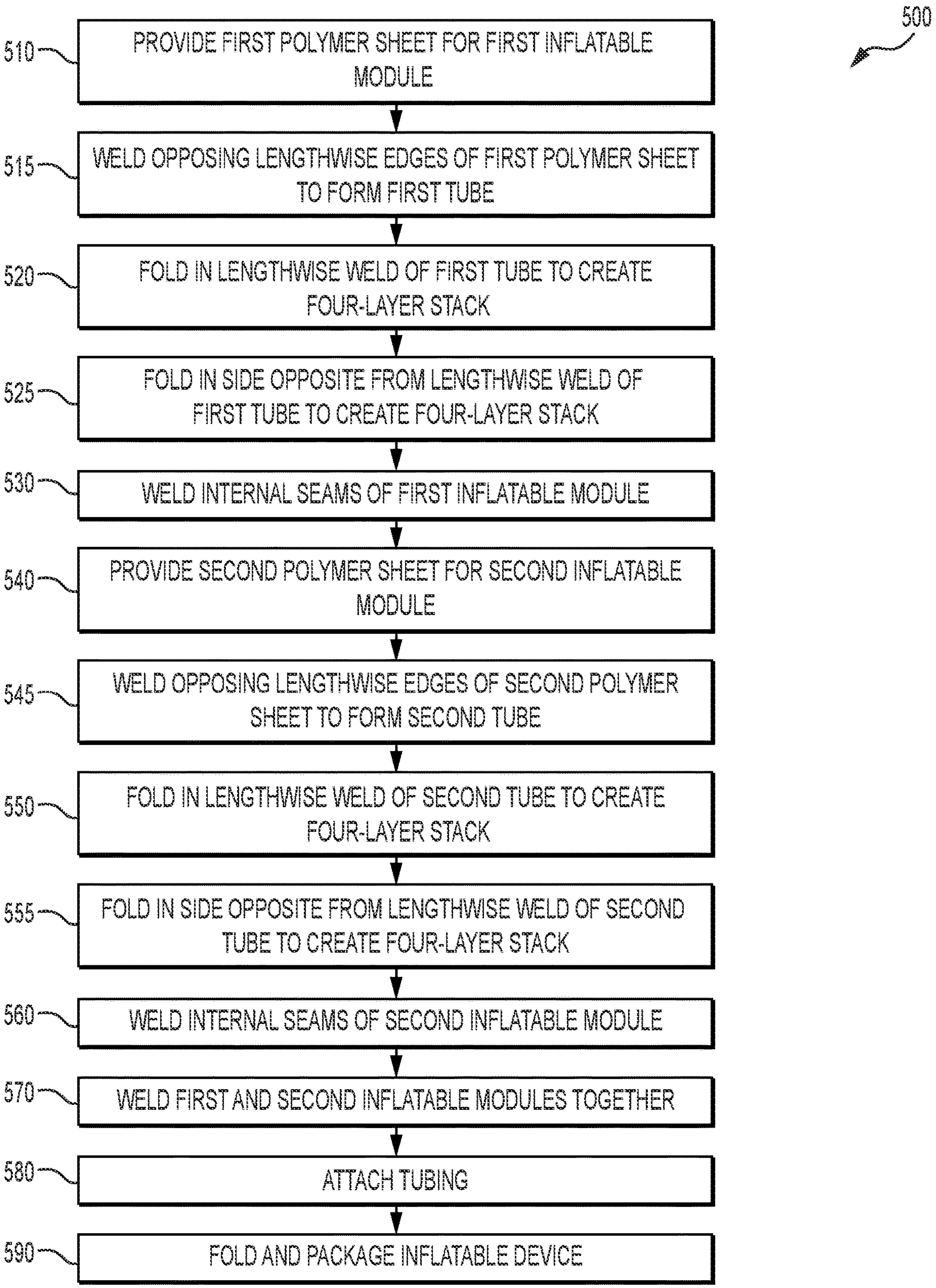
FIG. 11 is a flow chart of an embodiment of a method of manufacturing an inflatable device, in accordance with exemplary embodiments.

With reference to FIG. 11, an exemplary embodiment of method 500 for manufacturing inflatable device 100 is provided.

As in step 510, a first polymer sheet for first inflation module 1 may be provided. It is contemplated that prior to step 510, the polymer sheet is cut to an appropriate size. The process may proceed to step 515.

As in step 515, the lengthwise edges of the first polymer sheet may be welded together to form a first tube and creating interior weld 98. In some embodiments, tubing support structures 81 may be appropriately positioned along the lengthwise edges of the first polymer sheet prior to the welding process such that tubing support structures 81 are sealed into interior weld 98. The process may proceed to step 520.

As in step 520, interior weld 98 may be folded inwards into the first tube to create a first four layer stack on a first side of the first tube. The process may proceed to step 525.

As in step 525, the side of the first tube opposite from interior weld 98 may be folded inwards into the first tube to create a second four layer stack on a second side of the first tube. This process may create interior crease 99 opposite from interior weld 98. The process may proceed to step 530.

As in step 530, solid and/or partial seams of first inflation module 1 may be created. This may include welds (a), (b), (c), and/or (d). The process may proceed to step 540.

As in step 540, a second polymer sheet for second inflation module 2 may be provided. It is contemplated that prior to step 540, the polymer sheet is cut to an appropriate size. The process may proceed to step 545.

As in step 545, the lengthwise edges of the first polymer sheet may be welded together to form a second tube and creating interior weld 98. In some embodiments, tubing support structures 81 may be appropriately positioned along the lengthwise edges of the second polymer sheet prior to the welding process such that tubing support structures 81 are sealed into interior weld 98. The process may proceed to step 550.

As in step 550, interior weld 98 may be folded inwards into the second tube to create a third four layer stack on a first side of the second tube. The process may proceed to step 555.

As in step 555, the side of the second tube opposite from interior weld 98 may be folded inwards into the second tube to create a fourth four layer stack on a second side of the second tube. This process may create interior crease 99 opposite from interior weld 98. The process may proceed to step 560.

As in step 560, solid and/or partial seams of first inflation module 1 may be created. This may include welds (e), (f), (g), (h) and/or (i). The process may proceed to step 570.

As in step 570, first inflation module 1 and second inflation module 2 may be welded together at inflation module weld 95. The process may proceed to step 580.

As in step 580, tubing may be attached. In certain preferred embodiments, tubing 15/25/35 may be attached to external portions of already-embedded tubing support structures 81. In some embodiments, tubing 15/25/35, internal tubing 85, and/or tubing support structures 81 may be inserted/attached. The process may proceed to step 590.

As in step 590, the completed inflatable device 100 may be folded and placed into sealable packaging. The packaging may be sealed and may further be sterilized. Method 500 may be completed.

Controller 200

Figure 2:
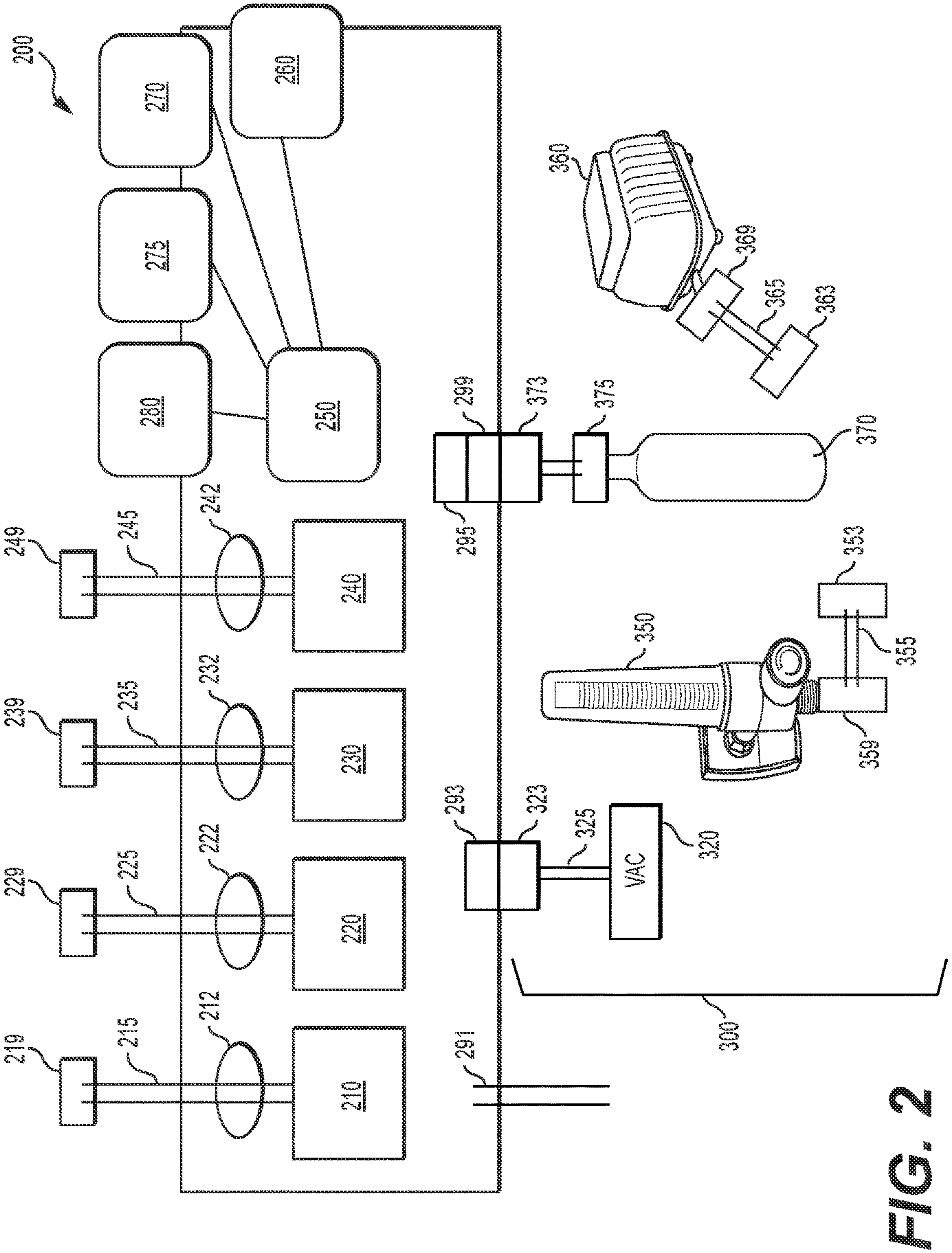
FIG. 2 is a block diagram illustrating an exemplary controller and various corresponding exemplary air pressure sources, in accordance with exemplary embodiments.

With reference to FIG. 2, an exemplary embodiment of controller 200 and pressure sources 300 is depicted. As shown, controller 300 may comprise head chamber switch 210 to control inflation and deflation of head chamber 10, back chamber switch 220 to control inflation and deflation of back chamber 20, thorax chamber switch 230 to control inflation and deflation of thorax chamber 30, and uterine tilt chamber switch 240 to control inflation and deflation of uterine tilt chamber 40. In alternative embodiments, controller 200 may vary in the number and/or types of chamber switches to correspond with various embodiments of inflatable device 100.

Each chamber switch 210/220/230/240 may be configured to switch between a first position that inflates its respective chamber 10/20/30/40 from an air pressure supply 340 (not labeled); a second position that deflates the chamber by connecting it to the outside environment via for example atmospheric/environmental air port 291; a third position that seals the chamber to maintain its current air content/pressure; and a fourth position that deflates the chamber rapidly by connecting it a vacuum source 320 (connections omitted from FIG. 2 for clarity).

In alternative embodiments, each chamber switch 210/220/230/240 may comprise only an open (flow) or closed position. In such embodiments controller 200 may comprise an additional pressurization switch (not shown) which connects to all chamber switches 210/220/230/240. The pressurization switch may be configured to switch between a first position that connects to an air pressure supply 340; a second position that connects to atmospheric air port 291; a third position that connects to vacuum source 320; and/or a fourth, closed, position.

In yet other embodiments, there may be an open/closed pressurization switch for air pressure supply 340, a two-position (open/closed) pressurization switch for air pressure supply 340, a two-position (open/closed) open/closed release switch for atmospheric air port 291, and/or a two-position (open/closed) open/closed vacuum switch for vacuum source 320)

Head chamber switch 210 may output to head inflation chamber 10 via internal tubing 215 and output port 219, which, in turn, may be configured to engage and fluidly connect with connector 19 of head inflation chamber 10. Controller 200 may further comprise pressure sensor 212 disposed within or about internal tubing 215 (or elsewhere within controller 200 or inflatable device 100) to monitor the air pressure of head inflation chamber 10 and/or within output port 219.

Back chamber switch 220 may output to back inflation chamber 20 via internal tubing 225 and output port 229, which, in turn, may be configured to engage and fluidly connect with input connector 29 of back inflation chamber 20. Controller 200 may further comprise pressure sensor 222 disposed within or about internal tubing 225 (or elsewhere within controller 200 or inflatable device 100) to monitor the air pressure of back inflation chamber 20 and/or within output port 229.

Thorax chamber switch 230 may output to thorax inflation chamber 30 via internal tubing 235 and output port 239, which, in turn, may be configured to engage and fluidly connect with input connector 39 of thorax inflation chamber 30. Controller 200 may further comprise pressure sensor 232 disposed within or about internal tubing 235 (or elsewhere within controller 200 or inflatable device 100) to monitor the air pressure of thorax inflation chamber 30 and/or within output port 239.

Uterine tilt chamber switch 240 may output to uterine tilt inflation chamber 40 via internal tubing 245 and output port 249, which, in turn, may be configured to engage and fluidly connect with input connector 49 of uterine tilt inflation chamber 40. Controller 200 may further comprise pressure sensor 242 disposed within or about internal tubing 245 (or elsewhere within controller 200 or inflatable device 100) to monitor the air pressure of uterine tilt inflation chamber 40 and/or within output port 249.

It is contemplated that internal tubing 215/225/235/245 may fully or partially comprise one or more manifolds within controller 200 in some embodiments.

As noted above, input connectors 19/29/39/49 maybe be omitted in certain embodiments. In such embodiments, output connectors 219/229/239/249 may be configured to directly and securely receive ends of tubing 15/25/35/45. To avoid or minimize the possibility of accidental tubing disconnections during inflatable device 100 use, it may be advantageous for output connectors 219/229/239/249 to quickly and easily receive and securely attach to tubing 15/25/35/45, but be more difficult to accomplish disconnection. Accordingly, output connectors 219/229/239/249 may comprise quick-connect fittings in certain preferred embodiments.

In certain preferred embodiments, chamber each switch 210/220/230/240 may be an electro-mechanical switch controllable by a computer processor or, in some embodiments, controllable by both a computer processor and manual (mechanical) user input. It may further be preferred if manual (mechanical) user inputs are additionally read by a computer processor. In alternative embodiments, each switch 210/220/230/240 may be a manually controller physical switch.

In certain embodiments, controller 300 may comprise internal computer 250, a/v output 260, integrated control buttons 270, external data interface 275, and/or external sensor interface 280.

Internal computer 250 may comprise well known computer elements including one or more processors, RAM, data storage, and/or the like as would be appreciated by a person of ordinary skill in the art; internal computer 250 may comprise a single microchip or multiple microchips in various embodiments. Although not depicted in FIG. 2, internal computer 250 may connect to each of switches 210/220/230/240; internal computer 250 may provide command signals to control switches 210/220/230/240 and/or receive data feedback from switches 210/220/230/240, which may, for example comprise an indication of their respective positions and/or operational statuses.

Although not depicted in FIG. 2, internal computer 250 may connect to each of pressure sensors 212/222/232/242. Internal computer 250 may receive data feedback from pressure sensors 212/222/232/242.

With reference to FIG. 2, internal computer 250 may also connect to a/v output 260, integrated control buttons 270, external data interface 275, and/or external sensor interface 280.

A/V output 260 may comprise one or more instrumentalities to provide audio and/or visual output to the operator of controller 200. In various embodiments, a/v output 260 may comprise one or more display units that may be configured to provide a visual indication of pressure readings, the status of various connections (including, but not limited to, connections to chambers 10/20/30/40 and/or to pressure/vacuum sources 300), controller 200 operation status, warnings and errors, power status, pressure supply status, the passage of time since various events, an indication when the HELP position has been approximated, and/or the like. In various embodiments, the display unit(s) may comprise video screens, LCD displays, and or any other technology known in the art. Additionally or alternatively, a/v output 260 may comprise LED status indicators on an outer housing of controller 200 that may be configured to provide indications of some or all of the statuses described above. Additionally or alternatively, a/v output 260 may provide a speaker or other form of auditory output that may provide indications of some or all of the statuses described above.

Integrated control buttons 270 may comprise digital or analog switches or buttons that may allow a user to indicate that pressure in an individual chamber 10/20/30/40 should be increased or decreased by a discrete amount. Internal computer 250 may control chamber switches 212/222/232/242 and/or pressurization valve switches and the like to adjust the pressure in the appropriate chamber accordingly. In some embodiments, such integrated control buttons 270 may additionally or alternatively comprise foot pedals to facilitate a medical professional being able to maintain control over chamber inflation levels without using their hands.

Alternatively, integrated control buttons 270 may comprise digital or analog switches or buttons that may allow for direct control of each of switches 210/220/230/240. In some embodiments, such integrated control buttons 270 may additionally or alternatively comprise foot pedals to facilitate a medical professional being able to maintain control over chamber inflation levels without using their hands.

In some embodiments integrated control buttons 270 may include numerical keypad(s), knobs, a keyboard, and/or the like configured to receive numerical input for setting inflation parameters (e.g., desired pressure levels for each chamber).

In some embodiments, integrated control buttons 270 may comprise a button configured to cause the saving of currently present inflation parameters; a button configured to allow all (or some chambers, for example, excluding uterine tilt chamber 40) to fully deflate via atmospheric connection; a button configured to allow all (or some chambers) to fully deflate via vacuum connection; and/or a button configured to result in reinflation to saved inflation parameters. In some embodiments, one or more of the full deflation buttons may be configured to additionally cause inflation parameters to be automatically saved before deflation commences.

In some embodiments controller 200 may comprise a touch screen comprising a display controlled via a/v output 260 and integrated control buttons 270 rendered on that display. Processor(s) controlling the touch screen and receiving data from the touch screen may be considered part of internal computer 250 in certain embodiments.

During use in the clinical context, intubation may typically occur soon after the HELP (or other desired) position is achieved; it is often desired that an intubated patient should return to a supine position for a surgical procedure or other medical intervention. This may be achieved by fully deflating inflatable device 100, and one or both of the full deflation buttons may facilitate a patient's rapid and controlled return to the supine position with limited continued effort and focus on the part of the medical professional. Return to the HELP (or other selected) position is often desired after a medical procedure to facilitate, for example, extubation (i.e., removal of the breathing tube), allowing a patient to breathe spontaneously during a post-procedure recovery period, and/or the like. Reinflation may be desired to enable efficient, effective, and/or automatic return to the HELP (or other selected) position. Accordingly, the disclosure contemplates the saving of inflation parameters (e.g., pressure settings for chambers 10/20/30) when a medical professional deems the HELP (or other selected) position to be reached, subsequent de-inflation, and later re-inflation such that substantially the same inflation parameters are automatically re-achieved.

Similarly, in the sleep context, a user or sleep professional may adjust chamber 10/20/30 inflation to achieve an optimal sleeping position. She may wish to save the corresponding inflation parameters (e.g., pressure settings for chambers 10/20/30) before deflating inflatable device 100 for storage or transport. When it is again time for sleep, she may be able to efficiently, effectively, and/or automatically return to the optimal inflation position by returning to the saved inflation parameters. In some embodiments, multiple sets of inflation parameters may be saved; these multiple sets may correspond to different individuals, different sleeping surfaces, and/or the like.

External data interface 275 may comprise a wireless and/or wired data interface between internal computer 250 and an external computer or other device. In exemplary wireless and wired embodiments, external data interface 275 may enable data communications over WIFI, Bluetooth, 5G, 4G, other wireless protocols, the Internet, ethernet cables, RS/232, and/or the like between internal computer 250 and an external smart phone, personal computer, tablet, keyboard, foot pedals (similar to those described above), and/or the like. Via external data interface 275, internal computer 250 may receive and transmit data and commands with such external devices. In this manner, operation of controller 200, including, but not limited to switches 210/220/230/240, may effectively be dictated by, for example, a smart phone, computer, or tablet running a corresponding mobile application, computer application, and/or web-based application. Similarly, controller 200 may receive input from a connected wired or wireless keyboard located nearby. And, in some embodiments, controller 200 may obtain data relating to patient body metrics from a local or networked medical data repository to facilitate estimation of inflation parameters (as will be further discussed below).

External sensor interface 280 may comprise a wireless and/or wired data interface between internal computer 250 and one or more sensor sets external to controller 200. For example, in some alternative embodiments, pressure sensors 212/222/232/242 may be located within or mounted upon inflatable device 100 instead of (or in addition to) being included within controller 200. Such external pressure sensors may provide chamber 10/20/30/40 pressure data to internal computer 250 via a wired and/or wireless external sensor interface 280.

In another example, external sensor interface 280 may wirelessly and/or wiredly connect to a digital camera within the clinical theater, and/or visual markers associated therewith. In this context, FIG. 3 may be considered an image of a patient captured with a digital camera. Achievement of the HELP (or other selected) position may be confirmed or assessed via a computer vision algorithm that determines when a substantially horizontal P-S line 5 (or relevant corresponding measure of optimal positioning) is achieved.

To facilitate detection of a suitable P-S line, to reduce computer vision software complexity, and/or improve robustness, reliability, precision, and/or accuracy of P-S line detection, pinna visual marker 288 and/or sternum visual marker 286 may be utilized. Markers 286/288 may be configured with conspicuous visual characteristics as to be easily and reliably detectable by a simple computer vision algorithm. For example, markers 286/288 may emit infrared, UV, and/or other wavelength of light in a particular pattern or frequency that would both be both unique to and safe in the clinical environment. Each respective marker 286/288 may utilize a distinct pattern or frequency so that they may be distinguished from each other. In alternative embodiments, markers 286/288 may be characterized by having unusual color, reflective, or refractive characteristics.

In certain embodiments, pinna visual marker 288 may comprise a substantially flat object comprising an adhesive (and preferably hypoallergenic) surface opposite a visually conspicuous surface, so that a medical professional may temporarily affix it upon a patient's pinna to prominently display the conspicuous surface to the camera. Such marker 288 may be disposable and/or contain a small battery. Sternum visual marker 286 may be a 3-dimensional object with a base surface configured to be placed by a medical professional upon a patient's sternum, and with one or more visually conspicuous sides. In some embodiments, marker 286 may be pyramid-shaped, cube-shaped, cylindrically-shaped, and/or the like. The base surface of marker 286 may comprise an adhesive (and preferably hypoallergenic) surface. Such marker 286 may be disposable and/or contain a small battery.

Additionally or alternatively, a laser level may be provided to a medical professional to confirm that P-S line 5 is level (or very close to it). The laser level may be configured to be hand held and/or mounted on a wall or other equipment. In some embodiments, the laser level may be integrated or connected with controller 200, and/or camera 281 and associated computer vision algorithms may be configured to identify characteristics of laser level output.

In yet another example, position sensors may be located within or mounted upon inflatable device 100, as further described below. Such external position sensors may provide positional data relevant to the patients' position to internal computer 250 via a wired and/or wireless external sensor interface 280.

In one contemplated set of embodiments, positioning information may be coordinated with data acquired from a robotic/computerized automated intubating device such that positioning adjustments can be made to improve the success of the robotic/computerized automated intubation. (See). In certain of such embodiments, a robotic/computerized automated intubating device may be connected to controller 200 via, for example, external data interface 275, and accordingly may control, may be controlled by, and/or be jointly controlled with controller 200. For reference, see Wang X, Tao Y, Tao X, Chen J, Jin Y, Shan Z, Tan J, Cao Q, Pan T. An original design of remote robot-assisted intubation system. Sci Rep. 2018 Sep. 7; 8(1):13403. doi: 10.1038/s41598-018-31607-y. PMID: 30194353; PMCID: PMC6128927; and Hemmerling T M, Wehbe M, Zaouter C, Taddei R, Morse J. The Kepler intubation system. Anesth Analg. 2012 March; 114(3):590-4. doi: 10.1213/ANE.0b013e3182410cbf. Epub 2011 Dec. 20. PMID: 22190550.

Pressure Sources 300

With reference to FIG. 2, controller 200 may comprise vacuum input connector 293, which may be configured to connect to vacuum source 320. In certain embodiments, vacuum source 320 may be provided by the clinical, hospital environment; in alternative embodiments, vacuum source 320 may be a pump or the like. Vacuum tubing 325 may be connected to vacuum source 320 on one end, and to vacuum connector 323 on the other. Vacuum connector 323 and vacuum input connector 293 may be configured to securely, but removably mate and fluidly connect vacuum source 320 to controller 200 for provision to switches 210/220/230/240. Vacuum connector 323 and vacuum input connector 293 may be common air-tight connectors or, in some embodiments may be customized and/or distinct from connectors 299/373 to reduce the likelihood of accidental misconnection.

Controller 200 may comprise pressure source input connector 299, which may be configured to connect to an air pressure supply 340. Air pressure supply 340 may comprise one of medical air source 350, pump 360, and pressurized canister(s) 370 at once. In preferred embodiments, controller 200 may further comprise a pressure attenuator 295 or similar valve to standardize pressure received from air pressure supply 340 prior to provision to switches 210/220/230/240. Additionally or alternatively, controller 200 may comprise an air supply pressure sensor (not shown) between pressure source input connector 299 and switches 210/220/230/240, and preferably after pressure attenuator 295; in the event of excessive input pressure is detected, internal computer 250 may prevent normal operation of controller 200 and/or provide an error alert.

In certain embodiments, medical air source 350 may be utilized in the clinical/hospital environment. Tubing 355 may be connected to medical air source connector 359 on one end, and to modular connector 353 on the other. Medical air source connector 359 may be configured to fluidly connect to medical air source 350. Modular connector 353 and pressure source input connector 299 may be configured to securely, but removably, mate and fluidly connect medical air source 350 to controller 200 for provision to switches 210/220/230/240.

In certain embodiments, pump/compressor air source 360 may be utilized in an environment lacking medical air, but where power is reliably available, such as within a rural medical facility, other less advanced medical facility, and/or a residential environment. Tubing 365 may be connected to pump/compressor air source connector 369 on one end, and to modular connector 363 on the other. Pump/compressor air source connector 369 may be configured to fluidly connect to pump/compressor air source 360. Modular connector 363 and pressure source input connector 299 may be configured to securely, but removably mate and fluidly connect pump/compressor air source 360 to controller 200 for provision to switches 210/220/230/240.

In certain embodiments, compressed air source 370 may be provided in an environment lacking medical air, and where reliable power might not be readily available, such as in an ambulance or other medical transport, in the wilderness, in a battlefield hospital, or in a medical theatre in an undeveloped country. Tubing 375 may be connected to compressed air source connector 379 on one end, and to modular connector 373 on the other. Compressed air source connector 379 may be configured to fluidly connect to compressed air source 370. For example, one, two, or more common $CO_2$ canisters may comprise compressed air source 370; compressed air source connector 379 may be configured to "crack" or open such canisters at the appropriate time so that the pressurized gas may be captured and used. Modular connector 373 and pressure source input connector 299 may be configured to securely, but removably mate and fluidly connect compressed air source 370 to controller 200 for provision to switches 210/220/230/240.

It is contemplated that in some embodiments, modular connectors 353/363/373 may interchangeably fit with pressure source input connector 299, thereby enabling a single embodiment of controller 200 to be readily utilized with any one of a plurality of suitable air pressure supply 340 types.

It is contemplated that controller 200 may be powered by battery and/or via standardized electrical outlet power. In some embodiments, controller 200 may comprise and/or connect to a rechargeable battery. Especially in situations where pump/compressor air source 360 is not being used, it may be expected that the power consumption of controller 200 may be limited, enabling long battery life. Battery life may be monitored by internal computer 350 and its status communicated via a/v output 260 and or to external devices via external data interface 275.

Controller 200 may comprise an outer housing (not shown). In various embodiments, the housing may be ergonomically designed to comfortably fit in a medical professional's hand; may be fully or partially mountable near or adjacent to a common rectangular OR table control box, for example, near the patient's head; may comprise a hook to hang on the metal bar of an OR table; and/or support a sterile environment by minimizing small holes and textures in its design and/or be easily wrappable in a thin layer of disposable plastic.

Inflation Sequence Embodiments

It has been observed that the order of chamber 10/20/30 inflation (and deflation) is important to avoid causing patient injury. At a high level, it may be important to maintain inflatable device 100 in a substantial wedge shape (e.g., an inclined plane) during inflation and deflation to prevent avoid acute hyperextension of the neck, as well as less severe instances of overarching of the neck, which may result if the patient's head is permitted to droop while the thorax is raised, as illustrated in FIG. 5C.

Accordingly, in preferred embodiments, head tilt inflation chamber 10 may be substantially inflated (or deflated) prior to back inflation chamber 20 and thorax inflation chamber 30. Additionally, in certain embodiments, thorax inflation chamber 30, whose cylinders 31/32/33/34 are somewhat aligned with and substantially support the head may be substantially inflated (or deflated) prior to back inflation chamber 20.

In various embodiments, head tilt inflation chamber 10 may be inflated to >95%, >85%, >75%, >65% and/or >55% of its target inflation level before back inflation chamber 20 is inflated to >5%, >10%, >20%, and/or >30% of its target inflation level. Conversely in such embodiments, head tilt inflation chamber 10 may not be deflated to <95%, <85%, <75%, <65% and/or <55% of its target inflation level before back inflation chamber 20 is deflated to <5%, <10%, <20%, and/or <30% of its target inflation level. With reference to the above, in certain preferred embodiments, requiring head tilt inflation chamber 10 inflations/deflations of 85% or above may be considered excessive and/or unnecessary.

In other embodiments, head tilt inflation chamber 10 may be inflated to >95%, >85%, >75%, >65% and/or >55% of its target inflation level before either back inflation chamber 20 or thorax inflation chamber 30 is inflated to >5%, >10%, >20%, and/or >30% of their respective target inflation levels. Conversely in such embodiments, head tilt inflation chamber 10 may not be deflated to <95%, <85%, <75%, <65% and/or <55% of its target inflation level before either back inflation chamber 20 or thorax inflation chamber 30 are deflated to <5%, <10%, <20%, and/or <30% of their target inflation levels, respectively. With reference to the above, in certain preferred embodiments, requiring head tilt inflation chamber 10 inflations/deflations of 85% or above may be considered excessive and/or unnecessary.

Once the head tilt inflation chamber 10 is fully or substantially inflated, back inflation chamber 20 and thorax inflation chambers 30 may be substantially inflated. Then, the HELP position may be suitably achieved by minor adjustments in inflation parameters to back inflation chamber 20 and/or thorax inflation chambers 30 that "fine tune" patient position.

In alternative embodiments, chamber 10 may be inflated somewhat simultaneously with chambers 20 and/or 30; and in yet other alternative (but disfavored) embodiments chamber 10 may be substantially inflated after chambers 20 and/or 30. In such cases, caution on the part of the medical professional should be used to avoid injury.

The above embodiments and guidance may comprise instructions for inflation and deflation of inflatable device 100 when inflation and deflation of chambers 10/20/30 are manually controlled by a medical professional and/or user in the sleep context.

However, it is contemplated that the above embodiments and guidance may be incorporated into software algorithms running on internal computer 250 and/or external devices (e.g., smart phones or tablets) connected thereto via external data interface 275 to support automatic or semi-automatic inflation or deflation of inflatable device 100 to, for example, predetermined patient-specific inflation levels.

Additionally or alternatively, software algorithms running on internal computer 250 may assess if certain error thresholds regarding differences in air pressure and/or other measured inflation parameters between head tilt inflation chamber 10 and back inflation chamber 20 and/or thorax inflation chamber 30 are exceeded. Appropriate alerts and/or corrective inflation steps may be taken when such error thresholds are exceeded.

Additionally or alternatively, inflatable device 100 may comprise one or more accelerometers or gyroscopes in, between, below, and/or adjacent to first and/or second head rest cylinders 33/34. Such sensor(s) may detect whether a patient's head is in a suitably supported position or if excessive neck arching is likely to be occurring or may soon occur. Such sensor(s) may provide feedback to internal computer 250 via external sensor interface 280 or the like. Appropriate alerts and/or corrective inflation steps may be taken when it has been determined that neck overarching is occurring and/or likely to occur.

Additionally or alternatively, inflatable device 100 may comprise two or more position sensors that assess inflation levels and/or positioning (such as, but not limited to head tilt) based on their relative proximity. Such sensor(s) may be positioned on the surface of or internal to inflatable device 100 and may be positioned, for example, at the intended position of the back of the patient's neck, on the base of inflatable device 100, directly below an estimated intended position of a patient's sternum. Such sensor(s) may provide feedback to internal computer 250 via external sensor interface 280 or the like. Appropriate alerts and/or corrective inflation steps may be taken when it has been determined that neck overarching is occurring and/or likely to occur.

Inflation and deflation of uterine tilt inflation chamber 40 may generally occur independently from inflation/deflation of inflation chambers 10/20/30. It is contemplated that, in most embodiments, a medical professional may obtain a desired level of uterine tilt for a patient by inflating "to result" and then making minor adjustments to "fine tune" the inflation level of chamber 40 to obtain a desired degree of uterine tilt.

Automated Inflation and Deflation Embodiments

In certain embodiments of automatic inflation (and deflation), target patent-specific inflation parameters may be defined by chamber 10/20/30 air pressure levels when the patient is in the HELP position or the like. As discussed above, such target patent-specific inflation parameters may be obtained, for example, via pressure data captured and saved by internal computer 250 once the HELP position, desired sleeping position, and/or the like is achieved. Such data may be captured by internal computer 250 and/or an external device before or upon receipt of a deflation command (such as a button press). Then, upon a reinflate command, inflatable device 100 may be returned to its original position by inflating each chamber 10/20/30 to its captured air pressure levels.

In certain embodiments of automatic inflation, target inflation levels may be estimated or determined via a patient's specific body metrics and a look-up table, fitted data curves, and/or the like. The inventors expect that a subset of body metrics such as patient height, weight, BMI, sex, predictors of difficult intubation (e.g., mallampati score, thyromental distance, ability to protrude the mandible, range of head and neck movement), head circumference, head width (for example as measured via visible lines 70), neck circumference, neck width (for example as measured via visible lines 70), chest circumference, torso width (for example as measured via visible lines 70), belly circumference, and/or other easily obtainable metrics (e.g. distances obtained using side measurement markings 79) may correspond to reliably predictive patent-specific target inflation parameters, such as a set of target pressure levels for chambers 10/20/30. In view of statistical correlations between body metrics, it is contemplated that only 2, 3, 4 or 5 of such body metrics may be needed to reliably estimate patent-specific target inflation parameters. In other embodiments of automatic inflation, target inflation levels may be estimated via data extracted from a patient's radiological imaging, including, but not limited to, modalities such as x-ray, computed tomography, magnetic resonance imaging and ultrasound.

The patient-specific set of target pressure levels for chambers 10/20/30 may be provided to controller 200 via integrated control buttons 270 and/or an external device connected through external data interface 275. In some embodiments, the numerical pressure levels may be directly input, for example via a keypad, such as a push-button keypad or a rendered keypad on a touchscreen. In other embodiments, an operator may input relevant body metric measurement values, and the estimated patent-specific inflation parameters may be determined therefrom. In yet other embodiments, relevant body measurement metrics and/or previously saved patient-specific inflation parameters may be electronically obtained from a patient's medical file.

Upon receiving the patient-specific inflation parameters and an inflation command, controller 200 may cause inflatable device 100 to achieve the patient-specific target inflation parameters, which may be expected to achieve or at least approximate the HELP or other desired patient position. If further positional adjustments are needed, inflation levels of back inflation chamber 20 and/or thorax inflation chambers 30 may be "fine-tuned" until the desired position is reached.

Figure 10:
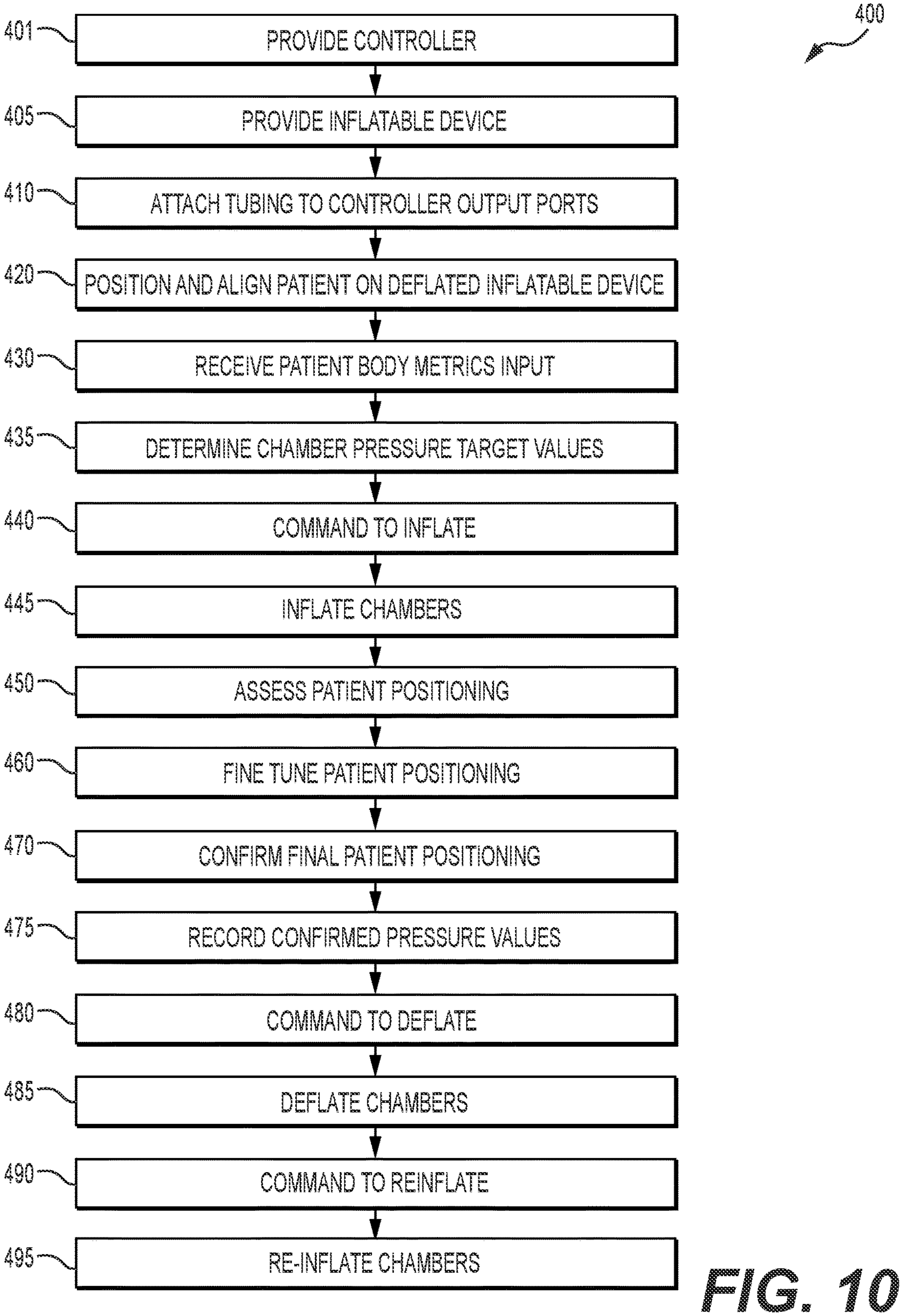
FIG. 10 is a flow chart of an embodiment of a patient positioning method, in accordance with exemplary embodiments.

With reference to FIG. 10, an exemplary embodiment of patient positioning method 400 is provided.

As in step 401, a controller 200 may be provided and set-up for use. A user may connect controller 200 to an air pressure supply 340, for example medical air 350. The user may power on controller 200, which may then run initial diagnostics. The user may check that its battery is sufficiently charged. The method may proceed to step 405.

As in step 405, an inflatable device 100 may be provided and set-up for use. For example, a user may remove the packaging from inflatable device 100, unfold it, and/or appropriately place and align it on an OR table or similar surface. In inflatable device 100 embodiments where table securing mechanism(s) 60 are included, the user may utilize mechanism(s) 60 to adhere or otherwise secure inflatable device 100 to the OR table or similar surface. If use of uterine tilt inflation chamber 40 may be anticipated, a user may secure uterine tilt cylinder 41 to its appropriate position (e.g. with respect to the patient's relevant body metrics) along the length of tail 50. The method may proceed to step 410.

As in step 410, tubing 15/25/25/45 maybe be attached to controller output ports 219/229/239/249 as appropriate. In certain preferred embodiments, the process may be facilitated through matching coloring on tubing 15/25/25/45 (and/or the ends thereof) and controller output ports 219/229/239/249 (and/or nearby elements of controller 200). In alternative embodiments, tubing 15/25/25/45 may additionally or alternatively be attached to inflatable input connectors 19/29/39/49 during this step. The method may proceed to step 420.

As in step 420, a user may position and align a patient upon inflatable device 100. Such alignment may include, for example, ensuring that patient is substantially centered on inflatable device 100, that the patient's buttocks is positioned upon tail 50, that the back of the patient's head is positioned on and/or between first and second head rest cylinders 33/34, and/or that uterine tilt cylinder 40 is appropriately positioned to enable uterine tilt. The method may proceed to step 430.

As in step 430, a user may input relevant patient body metrics to controller 200 (and/or otherwise) for use in determining target chamber inflation pressures. In some embodiments, numerical or binary values indicative of such body metrics may be inputted via touchscreen or push-button input (e.g., integrated control buttons 270). In alternative embodiments, relevant patient body metrics may be obtained from patient medical data files or imported from other electronic data sources. Internal computer 250 of controller 200, or alternatively computer connected through external data interface 275 of controller 200, may receive the patient body metrics data for processing. The method may proceed to step 435.

As in step 435, internal computer 250 of controller 200, or alternatively a computer connected through external data interface 275 of controller 200, may determine patient-specific chamber pressure target values for each of head tilt inflation chamber 10, back inflation chamber 20, and thorax inflation chamber 30, respectively. In contemplated embodiments, patient-specific chamber pressure target values may be determined through inputting the patient body metric data into a look-up table(s), mapping the patient's body metric data onto one or more fitted data curve(s), and/or use of a statistical data algorithm. It is contemplated that such look-up table(s), fitted data curve(s), and/or statistics be preloaded into internal computer 250 (or alternatively a computer connected through external data interface 275) and populated with data derived from real-word testing of inflatable device 100 on a variety of body habitus. The method may proceed to step 440.

As in step 440, a user may command controller 200 to inflate chambers 10/20/30 of inflatable device 100 to their corresponding patient-specific chamber pressure target values. Such command may serve as a confirmation that the patient is appropriately aligned with the deflated inflatable device 100. A user may input the inflation command/alignment confirmation via touchscreen or push-button input (e.g., integrated control buttons 270) of controller 200. The method may proceed to step 450.

As in step 445, controller 200, via internal computer 250, may inflate chambers 10/20/30 of inflatable device 100 to their corresponding patient-specific chamber pressure target values by, for example, manipulating chamber switches 210/220/230 to permit controlled inflow of pressurized air into chambers 10/20/30. In preferred embodiments, internal computer 250 may receive signals from pressure sensors 212/222/234, utilize such signals to determine pressure measurements for chambers 10/20/30, and/or compare to such pressure measurements to corresponding pressure target values.

Additionally, in preferred embodiments, controller 200, via internal computer 250, may order the inflation of chambers 10/20/30 to avoid or reduce the likelihood of hyperextension of the patient's neck, for example, via implementation of one or more of the inflation sequence embodiments, described above. Internal computer 250 may receive signals from pressure sensors 212/222/234, utilize such signals to determine pressure measurements for chambers 10/20/30, and/or compare to such pressure measurements to each other to implement such inflation sequence embodiment(s). The method may proceed to step 450.

As in step 450, a patient's positioning may be assessed to see if it is sufficient for intubation or other medical procedure or need. In some embodiments, step 450 may proceed manually; that is, a medical professional may assess the adequacy of the patient's position. Additionally or alternatively, the patients position may be automatically assessed by controller 200 utilizing, for example, readings from sensors/markers 281/285/286/288 and data received through external data interface 280, as discussed above. The method may proceed to step 460.

As in step 460, the patient's positioning may be fine-tuned via increasing the pressure (e.g., inflating) or decreasing the pressure (e.g., deflating) in chambers 10/20/30, as appropriate. In some embodiments, this process may be managed by the medical professional, who may command increased or lowered pressure in any of (or none of) chambers 10/20/30 via touchscreen or push-button input (e.g., integrated control buttons 270) of controller 200. It is contemplated that internal computer 250 may be configured to receive such commands as numerical pressure values and/or as increase/decrease command that may, for example, increase decrease pressure by a discrete amount per press of a corresponding pushbutton or touchscreen button. It is contemplated that such pushbutton or touchscreen buttons may be marked with up or down arrow and/or may reflect the color associated with their corresponding chambers, as discussed below.

Alternatively or additionally, fine-tuning may be effectuated automatically by internal computer 250 (or alternatively a computer connected through external data interface 275) utilizing readings from sensors/markers 281/285/286/288 and data received through external data interface 280. The method may proceed to step 470.

As in step 470, a user may confirm to controller 200 that the patient's current positioning as a final patient positioning. A user may input such final positioning confirmation via touchscreen or push-button input (e.g., integrated control buttons 270). It is contemplated that, in some embodiments, a user may further characterize the patient's current positioning in a manner that enables multiple positions to be saved per patient. The method may proceed to step 475.

As in step 475, internal computer 250 (or alternatively a computer connected through external data interface 275) may save the current pressures of chambers 10/20/30 as confirmed chamber pressure values. The method may proceed to step 480.

As in step 480, a user may command the controller 200 to deflate chambers 10/20/30 of inflatable device 100 to return the patent to the supine position. Such command may be issued when, for example, the patient has been successfully intubated. A user may input the deflation command via touchscreen or push-button input (e.g., integrated control buttons 270) of controller 200. In some embodiments, steps 470 and step 480 may be merged such that the user's deflation command may simultaneously serve as confirmation that final patient positioning has been obtain, and pressure recordation should proceed (as in step 475). The method may proceed to step 485.

As in step 485, controller 200, via internal computer 250, may deflate chambers 10/20/30 of inflatable device 100 to atmospheric pressure, for example, manipulating chamber switches 210/220/230 to permit controlled outflow of pressurized air from chambers 10/20/30 and through atmospheric air port 291 (and/or vacuum source 320). In preferred embodiments, controller 200, internal computer 250, may order the deflation of chambers 10/20/30 to avoid or reduce the likelihood of hyperextension of the patient's neck, for example, via implementation of one or more of the deflation sequence embodiments, described above. Internal computer 250 may receive signals from pressure sensors 212/222/234, utilize such signals to determine pressure measurements for chambers 10/20/30, and/or compare to such pressure measurements to each other to implement such deflation sequence embodiment(s).

It is contemplated that after step 485 and before step 490, a medical procedure may occur. Upon its conclusion, it may be desired that the patient be repositioned for extubation and/or recovery. The method may proceed to step 490.

As in step 490, a user may command the controller 200 to re-inflate chambers 10/20/30 of inflatable device 100 to their corresponding confirmed chamber pressure values (e.g., as saved in step 475). Such command may serve as a confirmation that the patient is appropriately aligned with the deflated inflatable device 100. A user may input the re-inflation command/alignment confirmation via touchscreen or push-button input (e.g., integrated control buttons 270) of controller 200. The method may proceed to step 495.

As in step 495, controller 200, via internal computer 250, may inflate chambers 10/20/30 of inflatable device 100 to their corresponding confirmed chamber pressure values by, for example, manipulating chamber switches 210/220/230 to permit controlled inflow of pressurized air into chambers 10/20/30. In preferred embodiments, internal computer 250 may receive signals from pressure sensors 212/222/234, utilize such signals to determine pressure measurements for chambers 10/20/30, and/or compare to such pressure measurements to corresponding confirmed chamber pressure values.

Additionally, in preferred embodiments, controller 200, internal computer 250, may order the re-inflation of chambers 10/20/30 to avoid or reduce the likelihood of hyperextension of the patient's neck, for example, via implementation of one or more of the inflation sequence embodiments, described above. Internal computer 250 may receive signals from pressure sensors 212/222/234, utilize such signals to determine pressure measurements for chambers 10/20/30, and/or compare to such pressure measurements to each other to implement such inflation sequence embodiment(s).

Method 400 may be completed. However, it is contemplated that various steps may repeated, re-ordered, or omitted as patient care directs or as otherwise desired by the user.

Color Coordination Embodiments

In certain embodiments, instrumentalities associated with each respective inflation chambers 10/20/30/40 may be color coordinated for ease of use; reduction of user error, for example, with respect in inadvertently inflating/deflating the incorrect chamber or making improper tubing connections; for aesthetic purposes; for branding purposes; and/or the like.

A first color may be associated with head inflation chamber 10. For example, one or both ends of head tilt cylinder 11, tubing 15, input connector 19, head chamber switch 210, output port 219, corresponding integrated control buttons 270 (including, for example, a corresponding foot pedal(s), up/down push buttons, and/or rendered buttons on a touch screen), corresponding portions of a/v output 260 (e.g., portions of touch screen, other display, and/or status LEDs), and/or corresponding portions of the housing of controller 200 may be conspicuously marked with this first color. In certain embodiments, the first color may be green, but this disclosure is not so limited.

A second color may be associated with back inflation chamber 20. For example, the one or both ends of first and/or second back cylinders 21/22, portions of back support surface 97, tubing 25, input connector 29, back chamber switch 220, output port 229, corresponding integrated control buttons 270, corresponding portions of a/v output 260, and/or corresponding portions of the housing of controller 200 may be conspicuously marked with this second color. In certain embodiments, the second color may be yellow, but this disclosure is not so limited.

A third color may be associated with thorax inflation chamber 30. For example, one or both ends of first and/or second base cylinders 31/32, one or both ends and/or tops of first and/or second head rest cylinders 33/34, tubing 35, input connector 39, thorax chamber switch 230, output port 239, corresponding integrated control buttons 270, corresponding portions of a/v output 260, and/or corresponding portions of the housing of controller 200 may be conspicuously marked with this third color. In certain embodiments, the third color may be blue, but this disclosure is not so limited.

A fourth color may be associated with uterine tilt inflation chamber 40. For example, portions of uterine tilt cylinder 41, tubing 45, input connector 49, uterine tilt chamber switch 240, output port 249, corresponding integrated control buttons 270, corresponding portions of a/v output 260, and/or corresponding portions of the housing of controller 200 may be conspicuously marked with this fourth color. In certain embodiments, the second color may be pink, but this disclosure is not so limited.

In certain embodiments, the end of tubing 15/25/35/45 opposite from chamber 10/20/30/40 may be marked with the appropriate coloring, for example, as a ring at or near the end of the tubing. Additionally or alternatively, tubing 15/25/35/45 may be tinted with the appropriate coloring. Because connecting tubing 12/25/35/45 to the wrong output port 219/229/239/249 may be an easily committed and consequential human error, color correspondence between the end of tubing 12/25/35/45 being manipulated and by a user and output port 219/229/239/249 and/adjacent portions of controller 200 may be advantageous.

Error Detection Embodiments

In certain embodiments, controller 200 may be configured to various malfunctions before they become apparent to a medical professional or other user. In one aspect, internal computer 250 may detect a malfunction if output port 219/229/239/239 is decreasing in pressure, for example, as indicated by signals from pressure sensor 212/222/232/234, while the output port 219/229/239/239 is expected to be closed or fluidly connected to a pressure source. Such malfunction may suggest either a puncture in corresponding chamber 10/20/30/40, disconnected tubing 15/25/35/45, and/or a disconnection or part failure within controller 200. Upon detecting such a malfunction, internal computer 250 may alert the use via an alarm and/or prominent message through an electronic user interface of or attached to controller 200. In another aspect, internal computer 250 may detect a malfunction if output port 219/229/239/239 is increasing in pressure, for example, as indicated by signals from pressure sensor 212/222/232/234, while the output port 219/229/239/239 is expected to be closed or fluidly connected to atmosphere. Such malfunction may suggest a part failure within controller 200. Upon detecting such a malfunction, internal computer 250 may alert the use via an alarm and/or prominent message an electronic user interface an electronic user interface of or attached to controller 200.

In some embodiments, controller 200 may include one or more pressure source pressure sensors to monitor pressure input from a connected pressure source. Such pressure source pressure sensor(s) may directly measure pressure from the pressure source and/or be configured to measure pressure after such pressurized air input attenuated by pressure attenuator 295. The pressure source pressure sensor(s) may be connected to, and provide a signal(s) to internal computer 250. In one aspect, internal computer 250 may detect a malfunction if the signal(s) indicates that there is insufficient pressure for inflatable device 100 to properly operate. Such malfunction may suggest that a pressure source has not been connected, that the pressure source valve has not been sufficiently opened, a malfunction in the pressure source or tubing from the pressure source, and/of a part failure within controller 200. In another aspect, internal computer 250 may detect a malfunction if the signal indicates that the pressure is too high. Such malfunction may suggest that a pressure source is overpowered, a malfunction in the pressure source, and/or a part failure within controller 200, such as a failure of pressure attenuator 295. Upon detecting such a malfunction(s), internal computer 250 may alert the use via an alarm and/or prominent message an electronic user interface an electronic user interface of or attached to controller 200.

OSA-Related Embodiments

When intended for sleep related uses, embodiments of inflatable device 100 may have additional modifications. This may be important because a sleeping individual may have a tendency to partially or fully roll to his side and/or turn his head.

In one embodiment, first and/or second head rest cylinders 33/34 may be configured with a central indentation and/or be higher up on the near the sides of inflatable device 100 to prevent rolling and/or gently utilize gravity to guide a rolled or rolling individual back to the desired, central position. Additionally or alternatively, second back cylinder 22 may be restructured in such a manner. In yet other embodiments, first head rest cylinders 33, second head rest cylinders 34, and/or second back cylinder 22 may respectively comprise two separate cylinders with a small gap in the middle to achieve a similar effect.

In other, alternative embodiments, additional guiding cylinders, u-shaped chambers or cushions, and/or the like may be disposed on top of head rest cylinders 33/34 to prevent head movement or rolling.

It is contemplated that in some OSA-related embodiments, a sleep professional may determine target chamber pressure values for an individual patient based upon that patient's body metrics, observed patient positioning in one or more inflation configurations, patent breathing measurements (e.g., pressure and/or flow) in one or more inflation configurations, measurements of patient airway cross-section size (e.g., taken by ultrasound) in one or more inflation configurations, subjective reports of patient comfort in one or more inflation configurations, and/or the like. In general, preferred target chamber pressure values may maximize patient spontaneous ventilation and/or CPAP assisted ventilation, while still ensuring sufficient patient comfort and to enable restful sleep.

In some embodiments, chambers 10/20/30 may be effectively sealed by the sleep professional, thereby enabling a patent to use inflatable device 100 at home without controller 200—and advantageously without a pressure source 300. It is contemplated that in such embodiments, tubing 15/25/35 may be removed from inflatable device 100 upon sealing. In other embodiments, tubing 15/25/35 may be truncated, for example, to span 6" or less. Input connectors 19/239 and/or tubing connection structure(s) 81 may comprise sealable valves; and such valves may preferably include tamper-proof features. In yet other embodiments, sealing may occur via placement of clamps remaining tubing 10/20/30.

In other embodiments, the sleep professional may provide the target chamber pressure values to the patient for use in a home/personal version of controller 200. In certain embodiments, controller 200 may be effectively controlled by a smart phone or tablet running an application. The patient or the sleep professional may upload the target chamber pressure values into the app. In such embodiments, a smart phone or tablet may connective with external data interface 275 via Bluetooth, WiFi, a USB connection, and/or the like. In this manner, the user may input data and control controller 200 via the app, as well as obtain data from controller 200 via the app.

Inflation outside of the clinical environment raises issues regarding the provision of a pressure source as hospital air is typically unavailable and sufficiently powerful pumps may be prohibitively large, heavy, and/or expensive. It is contemplated that, in some embodiments CO2 canisters 370 may be used as a pressure source. In other embodiments, chambers 10/20/30 may comprise additional ports to enable the patient, another person, or a low-powered pump to fully inflate inflatable device 100 when it is not being compressed by a patent. In such embodiments, a user may bring chamber 10/20/30 to substantially full inflation using lung-power or a low-power pump. Then, the user may lie on the inflated inflatable device 100. Once properly situated, controller 200 may deflate each chamber 10/20/30 to reach its respective target chamber pressure. It is contemplated that ordered deflation embodiments, as described above, may be utilized.

It is also contemplated that, in non-clinical embodiments, users of inflatable device 100 may obtain suitable target chamber pressure values without engaging with a sleep professional. Under such circumstances, off-the-shelf users may utilize inflatable device 100 to address un-diagnosed OSA, to address snoring issues, to enhance respiration during sleep, and/or to improve comfort. Controller 200 via, for example, internal computer 250 and/or application on a smart phone or tablet, may determine target chamber pressures for an individual patient based upon that patient's body metrics, measured patent breathing metrics (e.g., pressure and/or flow) in one or more inflation configurations, and/or subjective reports of patient comfort in one or more inflation configurations. Additionally or alternatively, a user may inflate and/or deflate each chamber 10/20/30 until a desirable position is met; then target chamber pressure values.

It is also contemplated that the outer surfaces of inflatable device 100 may be imbued with particular characteristics in, for example, OSA-related embodiments. In one aspect, certain surface portions of inflatable device 100 contacting the patient (e.g., directly or through a sheet) may comprise a gel-foam layer, a soft fabric layer, a cushion layer, and/or a texture to reduce the likelihood of pressure sores and/or improve comfort. For example, in various embodiments the upper portion(s) of tail 50, back support surface 97, first head rest cylinder 33, and/or first head rest cylinder 33 may include such altered surfaces.

In another aspect, inflatable device 100 may be configured to be anchored to a bed or otherwise reduce the likelihood of slippage with respect to the bed or other sleeping surface. For example, in various embodiments, the lower portion(s) of tail 50, underside uninflatable portion 91, first base cylinder 31, and/or second base cylinder 32 may comprise a non-slip polymer layer, a non-slip texture, a removable adhesive, velcro, and/or the like. In some embodiments, a sheet with corresponding Velcro strips may be utilized by a patient. Additionally or alternatively, inflatable device 100 may comprise straps that may be tucked under a mattress; in some embodiments, such straps may be looped, for example, to encircle a mattress corner; may comprise Velcro or another non-slip structure; and/or may comprise anchors to be placed under the mattress. Additionally, in some embodiments, upper portion(s) of tail 50, back support surface 97, first head rest cylinder 33, and/or first head rest cylinder 33 may include such altered surfaces to grip a sheet that may be interposed between inflatable device 100 and the user.

Pressure Sore Mitigation Embodiments

Patients undergoing surgery and bed-ridden individuals among others are at risk for pressure sores.

To reduce the risk of pressure sores during inflatable device 100 use, it may be recommended that a medical professional ensure that the presence of seams or wrinkles on a sheet between a patient and inflatable device 100 is minimized.

Additionally or alternatively, controller 200 may be configured to intermittently and repeatedly cause minor inflations and deflations in inflation chambers with cylinders that are adjacent to the patent—e.g., back inflation chamber 20 and thorax inflation chamber 30. Such minor inflations and deflations may occur while inflatable device 100 is substantially inflated—for example, during patient recovery and/or during a surgical, radiological, cardiology, and/or other interventional or non-interventional procedure lasting longer than 2 hours requiring elevation of the patient's torso to improve procedural exposure or patient comfort/ventilation.

In alternative embodiments, pressure undulations may also be desired when a patient is disposed upon inflatable device 100 for a substantial period of time and inflatable device 100 is fully or substantially deflated.

It is contemplated that such pressure undulations will not meaningfully change the patient's positioning, but may generate an almost imperceptible massaging action to stimulate blood flow through the skin and thereby mitigate the risk of pressure sores. Internal computer 250 may contain software with pre-programed defaults for frequency (e.g. every 1, 5, or 10 minutes) and/or intensity of the undulations, but it is contemplated that a medical professional may adjust such defaults. It is contemplated that, in some embodiments, the respective undulations of back inflation chamber 20 and thorax inflation chamber 30 may counteract each other to further minimize patient movement; for example, chamber 20 may inflate while chamber 30 deflates and vice versa. Additionally, or alternatively, the undulations may be turned on or off, set to a timer, or otherwise controlled by integrated control buttons (including, for example, buttons rendered on a touch screen or push-buttons) and/or via external data interface 275.

While it is contemplated that the uterine tilt inflation chamber 40 may also undulate, medical procedures relevant to uterine tilt—e.g., C-Sections—are usually completed an amount of time short enough that the pressure sore risk is minimal—e.g., well under 2 hours. Furthermore, the undulations may adversely affect a physician's ability to perform the medical procedure. Accordingly, while undulations of uterine tilt inflation chamber 40 are contemplated by this disclosure, in preferred embodiments, such undulators may only occur while uterine tilt inflation chamber 40 is substantially deflated—e.g., before the patient is tilted, near the end of a C-Section procedure, when the patient is recovering, and/or the like.

Patient Heating Embodiments

Maintaining consistent and appropriate patient body temperature is often a concern in the OR, NORA, and/or other medical facilities. Currently, blankets, heated blankets, and/or forced air warming devices, such as the 3M Bair Hugger may be used to address this issue.

In some embodiments, inflatable device 100 may further comprise heating elements such as, but not limited to electrical resistance-based heating elements. Such heating elements may be disposed within or upon, for example, one or more inflatable cylinders that are adjacent to the patent (e.g., cylinders 33/34/21/22); back support surface 97; and or tail 50. The heating elements may be controlled by controller 250 and/or an external device. In alternative embodiments, heating sources may include air-activated components that produce heat from exothermic reactions when exposed to air, such as, but not limited to, chemicals used in air-activated hand-warmers.

In other embodiments, inflatable device 100 may comprise structures configured to provide forced heated air to the patient's body as heating elements. For example, inflatable device 100 may comprise one or more sealed plastic pockets (e.g., not fluidly connected with any cylinder disclosed herein) each having a plurality of air distribution holes to direct forced warm forced air to the patient (typically through a sheet placed between a patient and inflatable device 100). Tail 50 may comprise a two-layer pocket with air distribution holes on an upper layer of tail 50 to direct warm air to the lower torso, butt, and/or upper legs of a patient. Alternatively or additionally, back support surface 97 may comprise a two-layer pocket with air distribution holes on an upper layer of back support surface 97 to direct warm air to the upper torso. The provision of forced warm air to the pocket(s) or otherwise may be controlled by controller 250 and/or an external device.

Additionally or alternatively, inflatable device 100 may further comprise one or more temperature sensors to monitor a patient's body temperature. Such temperature sensor(s) may communicate with internal computer 250 via external sensor interface 280. In turn, internal computer 250 may manage the heating elements to facilitate achievement and maintenance of a desirable body temperature.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure.

Any recited method can be carried out in the order of events recited or in any other order that is logically possible. Moreover, certain steps of recited methods may be omitted in various embodiments where logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of the claims that follow. The specification and drawings are accordingly to be regarded in an illustrative rather than restrictive sense.

We claim:

1. An inflatable device for patient positioning, the inflatable device comprising:

a first inflation module, the first inflation module including a tail, a first inflation chamber, and a second inflation chamber;

a second inflation module, the second inflation module including a third inflation chamber and a plurality of second inflation module uninflatable portions; and an inflation module weld, wherein:

the inflation module weld binds the tail of the first inflation module, a first uninflatable portion of the plurality of second inflation module uninflatable portions at a first end of the second inflation module, and a second uninflatable portion of the plurality of second inflation module uninflatable portions at a second end the second inflation module;

the second inflation module comprises a loop; and the first inflation chamber and the second inflation chamber are disposed within the loop.

2. The inflatable device of claim 1, wherein:

the first inflation chamber comprises a head-tilt cylinder structure;

the second inflation chamber comprises a first back cylinder structure and a second back cylinder structure; and the third inflation chamber comprises a pair of base cylinder structures and a pair of head rest cylinder structures.

3. The inflatable device of claim 2, wherein:

the first inflation module includes a first folded section comprising four stacked layers on a first side;

the first inflation module includes a second folded section comprising four stacked layers on a second side opposite the first side.

4. The inflatable device of claim 3, wherein:

the plurality of second inflation module uninflatable portions further comprises a rear side uninflatable portion attached to the pair of base cylinder structures and the pair of head rest cylinder structures;

the first uninflatable portion comprises a back support surface and is attached to the pair of head rest cylinder structures;

the second uninflatable portion is attached to the pair of base cylinder structures; and the inflation module weld connects the tail, the back support surface, and the second uninflatable portion.

5. The inflatable device of claim 4, wherein:

the inflation module weld defines an intersection of the first back cylinder structure and the tail.

6. The inflatable device of claim 2, wherein:

the plurality of second inflation module uninflatable portions further comprises a rear side uninflatable portion attached to the pair of base cylinder structures and the pair of head rest cylinder structures;

the first uninflatable portion comprises a back support surface and is attached to the pair of head rest cylinder structures;

the second uninflatable portion is attached to the pair of base cylinder structures; and the inflation module weld connects the tail, the back support surface, and the second uninflatable portion.

7. The inflatable device of claim 6, wherein:

the inflation module weld defines an intersection of the first back cylinder structure and the tail.

8. The inflatable device of claim 1, wherein:

a first tubing connection structure is embedded in the first inflation chamber;

a second tubing connection structure is embedded in the second inflation chamber; and a third tubing connection structure is embedded in the third inflation chamber.

9. The inflatable device of claim 8, wherein:

the first inflation module comprises a first lengthwise interior weld that seals the first inflation chamber and the second inflation chamber;

the second inflation module comprises a second lengthwise interior weld that seals the third inflation chamber;

the first and second tubing connection structures are sealed within the first lengthwise interior weld; and the third tubing connection structure is sealed within the second lengthwise interior weld.

10. The inflatable device of claim 9, wherein:

the first, second, and third tubing connection structures are barbed tubing connectors.

11. The inflatable device of claim 10, wherein:

the first, second, and third tubing connection structures are distinctly colored, respectively.

12. The inflatable device of claim 1, wherein:

the first inflation module includes a first folded section consisting of four stacked layers on a first side;

the first inflation module includes a second folded section consisting of four stacked layers on a second side opposite the first side.

13. The inflatable device of claim 12, wherein:

the first inflation module comprises a first lengthwise interior weld that seals the first inflation chamber and the second inflation chamber; and the first lengthwise interior weld defines an inner boundary of the first folded section.

14. The inflatable device of claim 13, wherein:

a first tubing connection structure is embedded in the first inflation chamber at the first lengthwise interior weld;

a second tubing connection structure is embedded in the second inflation chamber at the first lengthwise interior weld; and a third tubing connection structure is embedded in the third inflation chamber.

15. The inflatable device of claim 14, wherein:

the first, second, and third tubing connection structures are barbed tubing connectors.

16. The inflatable device of claim 12, wherein:

the second inflation module includes a third folded section comprising four stacked layers on a first side of the second inflation module;

the second inflation module includes a fourth folded section comprising four stacked layers on a second side opposite the first side of the second inflation module.

17. The inflatable device of claim 16, wherein:

the second inflation module comprises a second lengthwise interior weld that seals the third inflation chamber; and the second lengthwise interior weld defines an inner boundary of the third folded section.

18. The inflatable device of claim 17, wherein:

a first tubing connection structure is embedded in the first inflation chamber at a first interior weld;

a second tubing connection structure is embedded in the second inflation chamber at the first interior weld; and a third tubing connection structure is embedded in the third inflation chamber at the second lengthwise interior weld.

19. The inflatable device of claim 12, wherein:

a width of the first folded section is equal to a width of the second folded section.

20. The inflatable device of claim 12, wherein:

a width of the first folded section is between 1.5 and 3 inches; and a width of the second folded section is between 1.5 and 3 inches.

* * * * *